United States Patent [19]

Boothroyd et al.

[11] Patent Number: 4,598,365
[45] Date of Patent: Jul. 1, 1986

[54] PIPELINED DECIMAL CHARACTER EXECUTION UNIT

[75] Inventors: Donald C. Boothroyd, Phoenix; Robert W. Norman, Jr., Glendale; Howard J. Keller, Scottsdale, all of Ariz.

[73] Assignee: Honeywell Information Systems Inc., Phoenix, Ariz.

[21] Appl. No.: 481,224

[22] Filed: Apr. 1, 1983

[51] Int. Cl.[4] .............................................. G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,179,736 | 12/1979 | Wilhite | 364/200 |
| 4,224,677 | 9/1980 | Kindell et al. | 364/900 X |
| 4,396,982 | 8/1983 | Wada et al. | 364/200 |
| 4,530,052 | 7/1985 | King et al. | 364/200 |

Primary Examiner—Thomas M. Heckler
Attorney, Agent, or Firm—A. A. Sapelli; J. S. Solakian; A. Medved

[57] ABSTRACT

The present invention relates to an execution unit of a computing system which executes data manipulation type instructions and arithmetic type instructions on data words having a plurality of decimal character-type data formats. The pipelined execution unit of the present invention includes a first stage element which temporarily stores input data, the input data including operation commands defining said decimal type instructions, and input operand data. A second stage element executes a first predetermined group of the decimal type instructions. A third stage element, operatively coupled to said second stage element, executes a second predetermined group of the decimal type instructions, the second predetermined group including arithmetic type instructions.

29 Claims, 19 Drawing Figures

DATA WORD FORMATS
FIG. 3
A. 9-BIT CHARACTER FORMAT
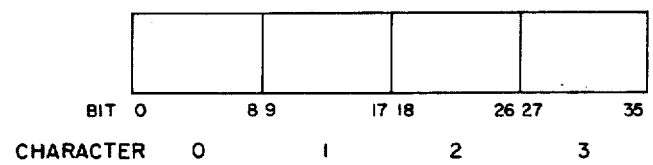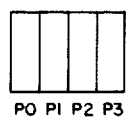
B. 4-BIT CHARACTER FORMAT
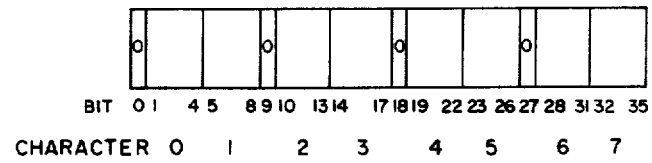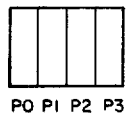
C. 6-BIT CHARACTER FORMAT
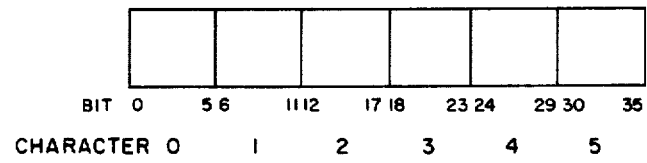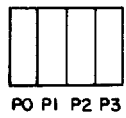
FIG. 4
A.
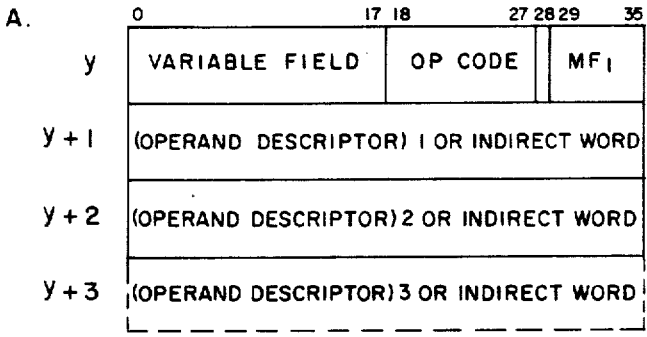
B. BIT STRING OPERAND DESCRIPTOR FORMAT
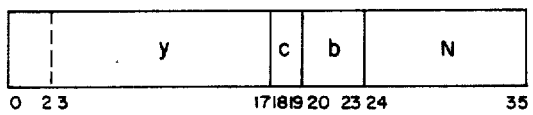
C. ALPHANUMERIC OPERAND DESCRIPTOR FORMAT
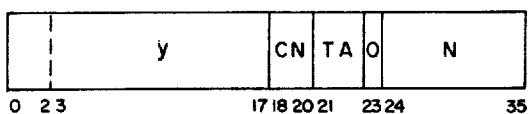
D. NUMERIC OPERAND DESCRIPTOR FORMAT
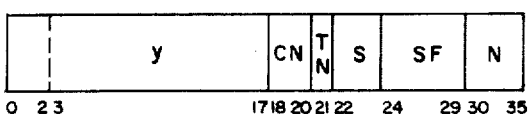

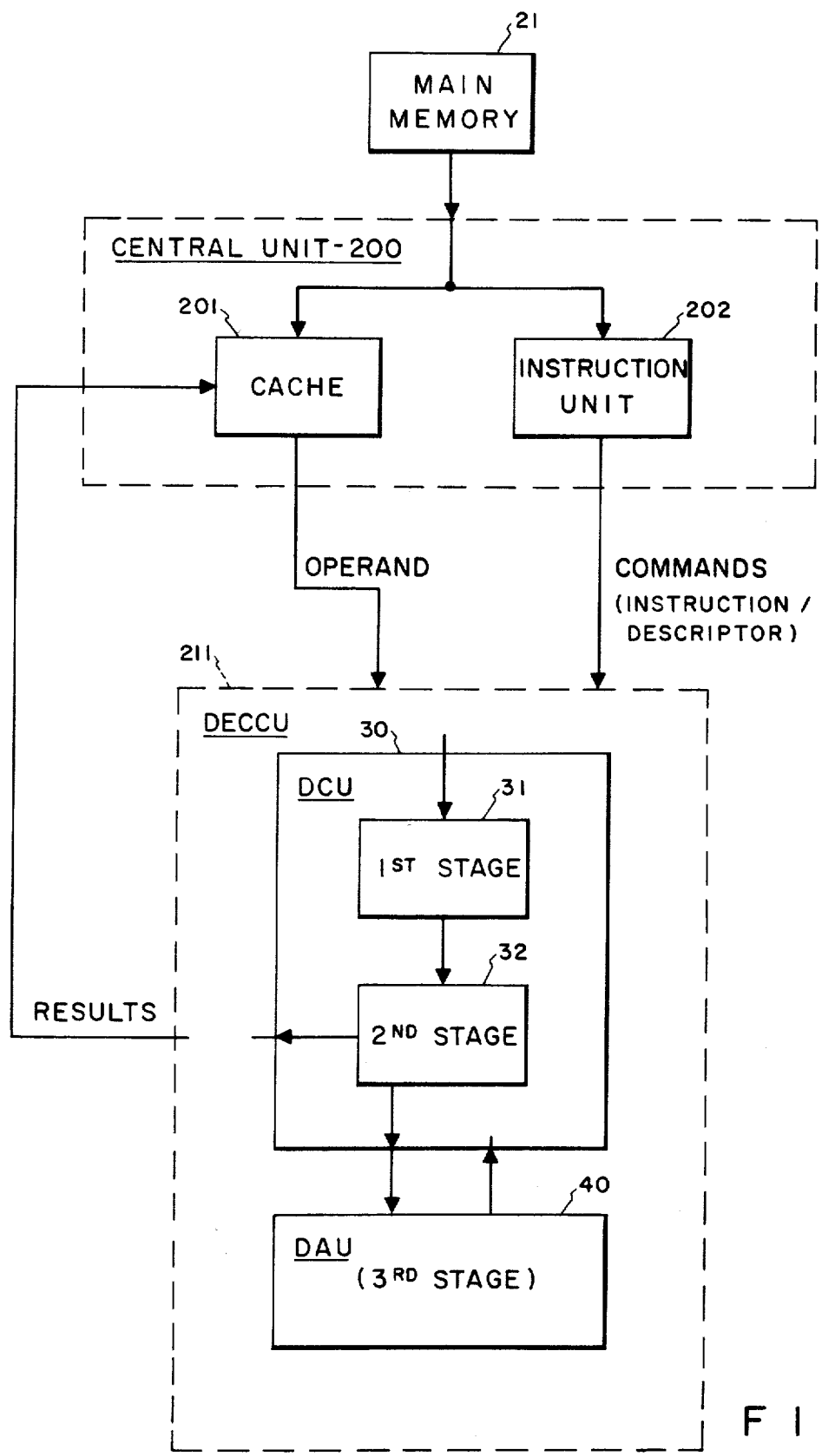
F I G. 5

FIG. 8

| | 0 1 | 8 9 | | 14 | | 18 19 20 | 21 22 | 23 24 | 26 27 | 35 |
|---|---|---|---|---|---|---|---|---|---|---|
| I | EXECUTION CODE | | SF$_1$ | | | TYP$_1$ | SN$_1$ | | SEQ# | FILL |
| D1 | DCW$_1$ | BP$_1$ | W$_1$ | SF$_2$ | ///// | TYP$_2$ | SN$_2$ | Z$_1$ G$_1$ | | L$_1$ − 1 |
| D2 | DCW$_2$ | BP$_2$ | W$_2$ | SF$_3$ | ///// | TYP$_3$ | SN$_3$ | Z$_2$ G$_2$ | | L$_2$ − 1 |
| D3 | DCW$_3$ | ///////////// | ///// | ///////// | ///////// | Z$_3$ G$_3$ | | L$_3$ − 1 |

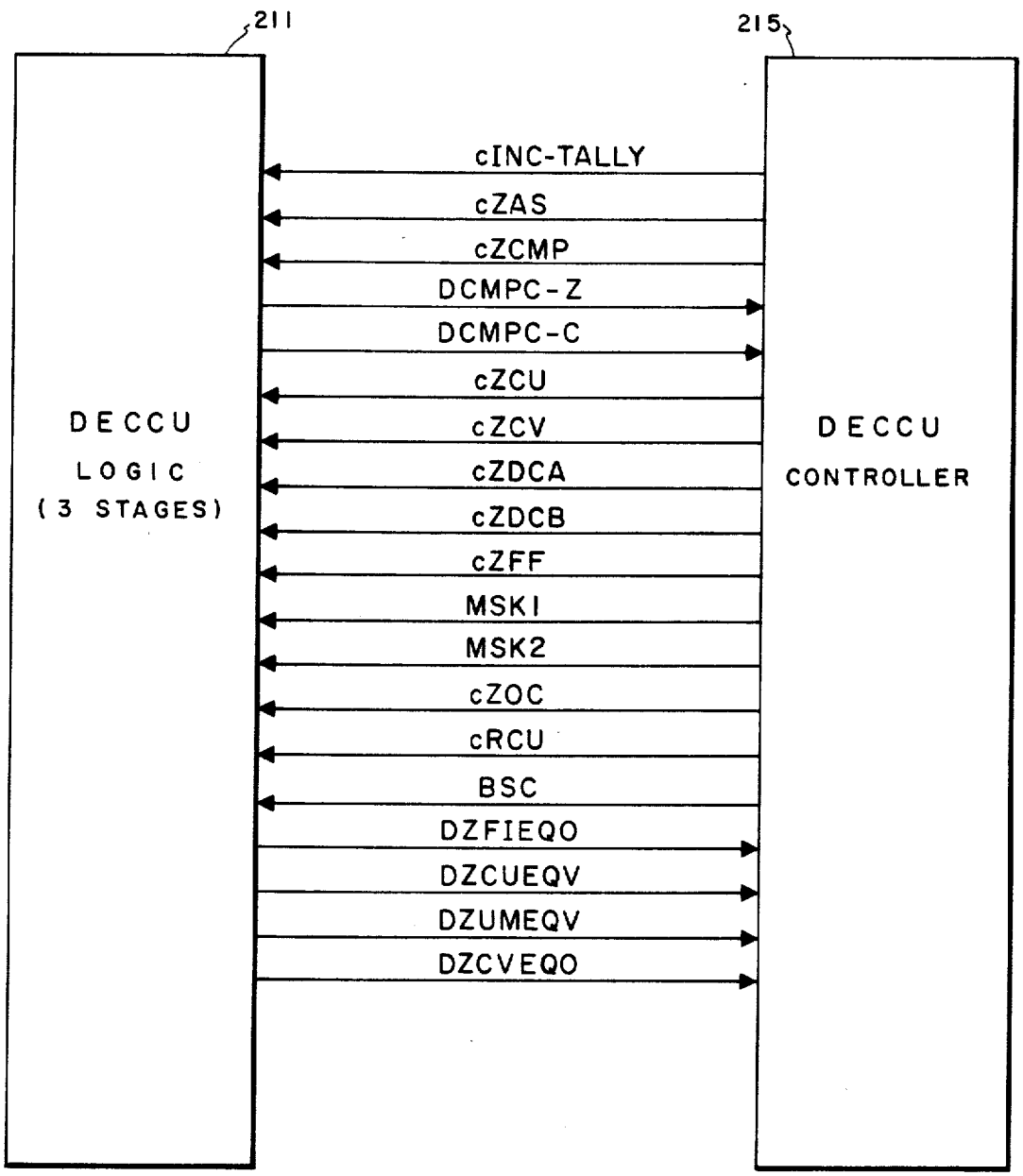
F I G. 14

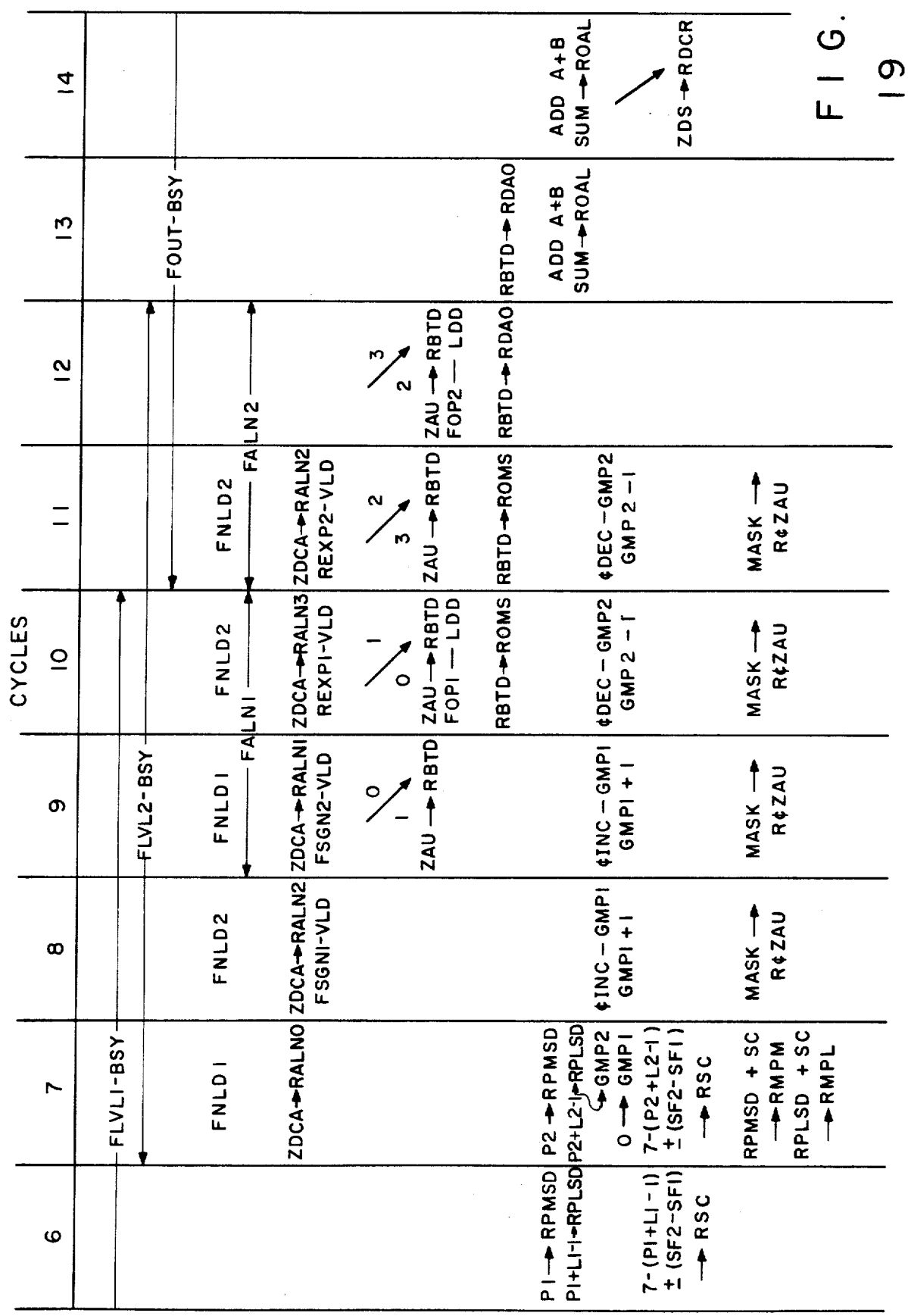

PIPELINED DECIMAL CHARACTER EXECUTION UNIT

RELATED PATENT APPLICATIONS

The present patent application is related to the following U.S. patent applications and U.S. Patent, which are assigned to Honeywell Information Systems Inc., the assignee of the present application, all of the references listed below being incorporated by reference herein, to the extent necessary for an understanding of the present invention.

1. Apparatus for Aligning and Packing a First Operand Into a Second Operand of a Different Character Size, by Donald C. Boothroyd et al, Ser. No. 394,952, filed on July 2, 1982, now U.S. Pat. No. 4,583,199;

2. Data Alignment Circuit, by Donald C. Boothroyd et al, Ser. No. 394,951 filed on July 2, 1982, now U.S. Pat. No. 4,506,345;

3. Collector, by R. Guenthner, G. Edington, L. Trubisky, and J. Circello, Ser. No. 434,129, filed Oct. 13, 1982;

4. Apparatus for Detecting a Predetermined Character of a Data String, by Donald C. Boothroyd et al, Ser. No. 481,226, filed on even date herewith, now U.S. Pat. No. 4,575,795;

5. U.S. Pat. No. 4,268,909, entitled "Numeric Data Fetch-Alignment of Data Including Scale Factor Difference", by Kindell et al;

6. Method for Decreasing Execution Time of Numeric Instructions, by Donald C. Boothroyd et al, Ser. No. 481,202, filed on even date herewith;

7. Apparatus for Forward or Reverse Reading of Multiple Variable Length Operands, by Donald C. Boothroyd et al, Ser. No. 481,225, filed on even date herewith;

8. Data Available Indicator for an Exhausted Operand String, by Donald C. Boothroyd et al, Ser. No. 481,227, filed on even date herewith;

9. Wraparound Buffer for Repetitive Decimal Numeric Operations, by Donald C. Boothroyd et al, Ser. No. 481,228, filed on even date herewith.

BACKGROUND OF THE INVENTION

This invention relates to an execution unit of a central processing unit within a data processing or computer system, and more particularly, to an apparatus for executing data manipulation type instructions and arithmetic type instructions on data words having a plurality of decimal character-type data formats.

In computer systems, various type computer words are defined having specific formats, including instruction words having a specified instruction format and data words having a plurality of predetermined data formats. In order to maximize the efficiency of the overall computer system, the data words can take on a variety of formats. The formats are defined to maximize memory storage efficiency, to minimize the time required for the conversion to an output device format, to maintain the data in a format readily available to the execution units, etc., the data selection being made by the designer to achieve one or more of the aforementioned objectives as they relate to the computer word size.

The various alpha, numeric, and special characters can be defined in a computer in a variety of ways. In many present, existing systems the characters are defined utilizing a grouping of eight bits in a coded format, commonly known as an 8-bit binary coded decimal (BCD) format. This grouping of eight bits allows sufficient capacity to define all the alpha characters, both upper and lower case, the numeric characters, and a variety of special characters, the 8-bit BCD format having achieved a high degree of standardization within the computer industry. In addition, the eight bits are divisible into the standard computer word sizes of many computer systems, these computer systems utilizing 8-bit bytes, or words of 16, 24, or 32 bits. These computer word sizes being divisible by 8 allow for a high degree of symmetry which is highly desirable in data manipulation. Occasionally a data word format is defined which eludes the desired symmetry. When such a case exists extra processing is required in manipulating the data. In large data systems, a computer word size of 36 bits is sometimes defined. In this case, in order to accommodate the 8-bit BCD standard, a data word format of four characters having 9 bits each can be defined within the 36 bit computer word. A second data word format can be defined such that the 9 bit character can be divided to include two four-bit numeric characters. In such a format the symmetry mentioned above has been violated such that an extra bit exists in the nine-bit field. Still another data word format can be defined such that the 36-bit computer word is divided into 6 characters of 6-bits per character.

In computer systems, basic operations must be performed. The computer system must fetch the instruction word from a main memory storage unit, decode the operation code contained in the instruction word, and then execute, i.e., perform that operation, on some predetermined data.

For computer systems, and more specifically the central processing unit of the computer system, having a single execution unit, the instruction execution is performed in a serial or sequential manner, the execution sequence corresponding to the instruction sequence. For complex instructions, such as decimal add and decimal multiply, the long execution times required to execute these instructions will significantly slow down the operating speed of the computer system. Many techniques have been implemented to assist in speeding up the operation of the computer system, one such technique being what is commonly known as pipelining. In pipelined CPUs with single execution units some increase in operating speed can be achieved. However, in order to achieve high operating speeds, multiple execution units can be used. In this manner, the next instruction can begin execution even though the previous instruction has not completed its execution. Such an execution unit, a decimal character execution unit, can be provided to perform the operation specified by an operation code contained in an instruction word, the operations including data manipulation and arithmetic operation on data words having a plurality of decimal character-type data formats.

In previous decimal character execution units, instruction execution did not overlap. In the present invention, a decimal character execution unit is provided having a pipelined structure permitting instruction execution overlap thereby significantly increasing the speed of executing the data manipulation instruction and arithmetic instructions operating on the decimal character-type data.

SUMMARY OF THE INVENTION

Therefore, there is supplied, in a data processing system, having a main storage element and having a central unit for performing the initial operations leading to the execution of instructions by at least one execution unit, a pipelined execution unit for executing decimal type instructions. The pipelined execution unit comprises a first stage element for temporarily storing input data, the input data including operation commands defining the decimal type instructions, and input operand data. A second stage element, operatively connected to the first stage element, executes a first predetermined group of the decimal type instructions.

The pipelined execution unit further comprises a third stage element, operatively coupled to the second stage element, which executes a second predetermined group of the decimal type instructions, the second predetermined group including arithmetic type instructions, and a fourth stage element operatively connected to the second stage element and to the third stage element, for temporarily storing output data resulting from the execution of the operation commands.

The first stage element comprises a first input buffer element for temporarily storing at least one operation command, a second input buffer element for temporarily storing input operand data associated with the temporarily stored operation command, and a switch element, operatively connected to the second input buffer element, for distributing the temporarily stored input operand data to the second stage element.

The second stage element comprises a first network element, having an input terminal adapted to receive the input operand data, the input terminal of the first network element operatively connected to the switch element, for aligning the input operand data in a predetermined format, and further having an output terminal adapted to transmit the aligned input operand data, the output terminal of the first network element operatively connected to the third stage element and to the fourth stage element. A second network element, has a first and second input terminal adapted to receive the input operand data and the aligned input operand data, respectively. The first input terminal of the second network element is operatively connected to the switch element and the second input terminal of the second network element is operatively connected to the output terminal of the first network element. The second network element performs a magnitude comparison between the input operand data and the aligned input data to generate a zero indicator signal and a carry indicator signal. The second network element has an output terminal adapted to transmit predetermined characters. The second stage element further includes a third network element having an input terminal adapted to receive a character string, the input terminal of the third network element is operatively connected to the output terminal of the second network element, for performing edit operations on the character string, and further having an output terminal adapted to transmit an edited output string, the output terminal operatively connected to the fourth stage element.

Accordingly, it is an object of the present invention to provide an apparatus for executing instructions on data words having a plurality of decimal character-type data formats.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3 shows a plurality of data word formats of the central processing unit;

FIG. 4 shows the instruction word and descriptor word formats of the computer word of the central processing unit having a system configuration utilizing a plurality of execution units, including a decimal character unit of the present invention;

FIG. 5 shows a functional block diagram of the decimal character unit of the present invention;

FIG. 8 shows a format of the decimal character unit instruction and descriptor words;

FIG. 14 shows control signals between the DECCU and the DECCU controller;

FIG. 19 shows a detailed control sequence for a two descriptor add instruction.

DETAILED DESCRIPTION

Figure 1:
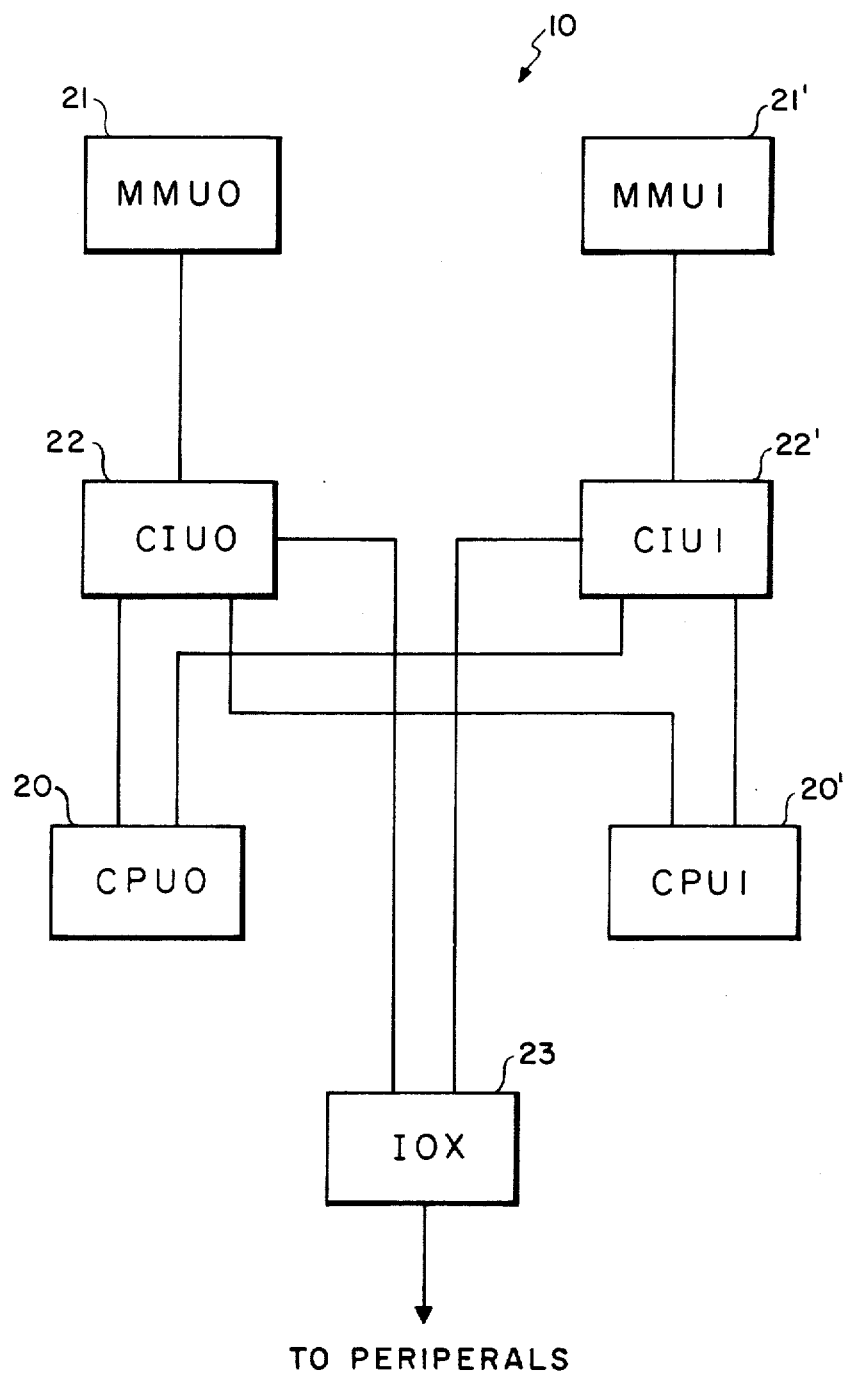
FIG. 1 shows a block diagram of a data processing system having a plurality of modules, including a central processing unit.

The present invention finds particular application in a central processing unit for executing a predetermined class of instructions, namely decimal arithmetic and character operations. Referring to FIG. 1, a central processing unit (CPU) is shown as a module of a data processing system (DPS) 10. A first central processing unit (CPU 0) 20 and a second central processing unit (CPU 1) 20' comprise the CPU modules of DPS 10, each having full program execution capability and performing the actual information processing of the data processing system 10. CPU 0 20 and CPU 1 20' are each operatively connected to a first main memory unit (MMU0) 21 and a second main memory unit (MMU1) 21', through a first central interface unit (CIU 0) 22 and a second central interface unit (CIU 1) 22', respectively. MMU 0 and MMU 1 store programs and data utilized by CPU 0 and CPU 1. CIU 0 and CIU 1 act as the memory managers for the respective memories. CIU 0 and CIU 1 are each connected to an input/output multiplexer (IOX) 23 which provides an interface between the MMU and the various system peripherals. All CPU communication and interaction with other system modules is via the CIU. The DPS 10 of FIG. 1 shows a two CPU/two CIU configuration. It will be understood by those skilled in the art that various configurations are possible, including a single CIU/CPU configuration.

Figure 2:
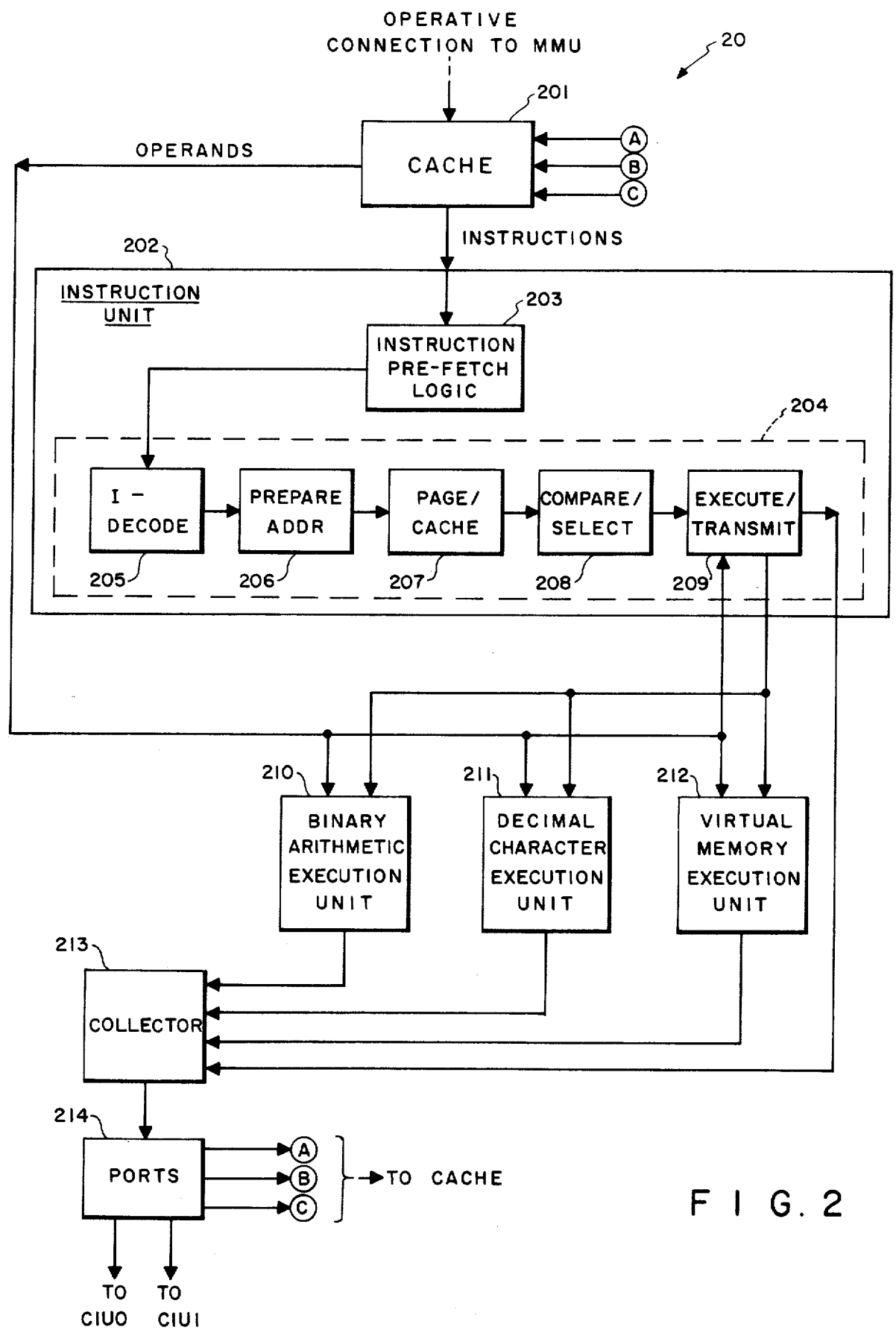
FIG. 2 shows a block diagram of the preferred embodiment of the central processing unit in which a decimal character unit of the present invention can be found.

Referring to FIG. 2, there is shown a block diagram of the preferred embodiment of the CPU 20 in which the present invention may be found. A cache memory (or more simply cache) 201 is provided for storing small blocks of words read from the main memory unit 21. The small blocks of words stored in cache 201 contain some instruction words and data words (or operand words) which will presently be executed and operated on by the execution units of CPU 20. An instruction unit 202 is included which comprises an instruction prefetch logic 203 and an instruction execution pipeline 204. The instruction prefetch logic 203 provides the instruction execution pipeline 204 with a supply of instructions to be executed. This is accomplished by including logic to predict the instruction sequence, prefetching instruction words from the cache memory 201, and storing them within the instruction prefetch logic block 203. The instruction execution pipeline 204 (also referred to herein as a central unit pipeline structure (CUPS)) performs the steps required for the execution of an instruction in individual stages. The first stage (I-DECODE) 205 receives the instruction to be executed from the instruction prefetch logic 203 and decodes the instruction. The second stage (Prepare Address) 206 prepares the virtual address. The third stage (Page/Cache) 207 performs a paging operation of the operand address and cache directory lookup. The fourth stage (Compare/Select) 208 initiates an operand access from cache 201 or from the main memory unit 21 in the case of a cache miss. The fifth stage (Execute/Transmit) 209 performs the actual execution of the instruction or dispatches information to an appropriate execution unit for execution.

In the preferred embodiment of the CPU, while all instructions must pass through all five stages of the central unit pipeline structure 204, not all instructions are fully executed in the fifth stage 209 of the pipeline. Some instructions are transmitted to other execution units outside the central unit pipeline structure 204, while the central unit pipeline structure 204 continues execution of succeeding instructions. The fifth stage 209 includes a basic operations execution unit (not shown) and central execution unit (not shown). The basic operations execution unit (not shown) performs the execution of those predetermined instructions which may be classified as basic operations. These are mostly very simple instructions requiring one or two cycles, including fixed point arithmetic (except multiply and divide), boolean operations, fixed point comparisons, register loads and shift operations. The central execution unit (not shown) executes a different set of predetermined instructions which refer to other instructions, move the contents of address registers or address related quantities between registers and storage, or alter processor stages.

Three additional instruction execution units are provided outside the central unit pipeline structure 204. A binary arithmetic execution unit 210 (BINAU) performs the execution of both binary and hexadecimal arithmetic operations and a fixed point multiply and divide. A decimal character execution unit (DECCU) 211 executes instructions involving decimal arithmetic, move and translate operations, character manipulations and binary string operations. The virtual memory execution unit (VMSM) 212 performs the execution of many privileged instructions including segment descriptor register manipulation, and handling fault and interrupt situations which manipulate the respective fault and interrupt registers. Each of the aforementioned execution units receives operands from the cache 201, and instructions (or commands) and descriptors from logic (not shown) of the fifth stage 209. Further, each execution unit usually operates independently of any activity occurring in the other execution units.

A collector execution unit, or more simply collector, 213 is the execution unit for most store instructions and is also the final execution unit involved in all other instructions. The collector 213 retrieves results from various results stacks of the other execution units, and updates cache 201 through a ports unit 214. The collector 213 also keeps a master copy of all program visible registers (not shown). The collector 213 permits the execution units to generate results independently and at different rates of speed, then updates the respective registers and cache in the original program sequence. The collector is more fully described in U.S. patent application Ser. No. 434,129 filed Oct. 13, 1982, entitled "Collector" by R. Guenthner, G. Edington, L. Trubisky, and J. Circello, assigned to the same assignee as the present application, the aforementioned application being incorproated by reference herein to the extent necessary for an understanding of the present invention. The ports unit 214 handles the CIU/CPU command interface processing, and the hierarchy control communication, i.e., the CIU/CPU memory hierarchy.

Although the preferred embodiment of the CPU 20 described above includes among its features paging, a 5-stage pipeline, instruction prefetch, virtual addressing, etc., it will be understood by those skilled in the art that the architecture of the DPS 10 or the CPU 20 described above is in no way intended to limit the present invention.

Referring to FIG. 3, there is shown a 36-bit computer word of the preferred embodiment having a nine-bit character format, a four-bit character format, and a six-bit character format. The nine-bit character format (FIG. 3A) utilizes 9 bits to define a character, bits 0–8, 9–17, 18–26, and 27–35 defining characters 0, 1, 2 and 3, respectively. The four-bit character format (FIG. 3B) utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the figure), bit 0, is essentially a "don't care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or don't care bit, of the four-bit character format word, bits 0, 9, 18 and 27 can always be set to zero. The six-bit character format (FIG. 1C)

utilizes 6 bits to define a character, bits 0-5, 6-11, 12-17, 18-23, 24-29, and 30-35 defining characters 0, 1, 2, 3, 4, and 5 respectively. Four additional bits in both the 9 and 4 bit character formats $P_0$, $P_1$, $P_2$, and $P_3$, can be carried along as the parity bits of respective characters. The "don't care" bit of the four-bit character bit is utilized, in the preferred embodiment, as a parity bit, and will be described in detail hereinunder.

FIG. 4A shows the computer instruction format of the preferred embodiment. The instruction word is the first word of the grouping and resides in the main memory unit 21 of the DPS 10 at a location Y. Up to three operand descriptor words, or simply descriptor words, reside in contiguous locations Y+1, Y+2, and Y+3, the number of descriptor words being determined by the particular instruction word. The instruction word contains the operation code, OP CODE, which defines the operation to be performed by the CPU. A second field $MF_1$ is the modification field which describes the address modification that is performed for descriptor 1. A third field, the Variable Field, contains additional information concerning the operation to be performed and will differ from instruction to instruction. When descriptors 2 and 3 are present, the Variable Field will contain information to describe the address modification to be performed on these operands. The descriptor words can be either the operand descriptor or an indirect word which points to the operand descriptor.

The operand descriptors which describe the data to be used in the operation, and provide the address for obtaining it from the main memory unit 21 are shown in FIGS. 4B, 4C, and 4D. A different operand descriptor format is required for each of the three data types, the three data types comprising the bit string, alphanumeric, and numeric types. The field denoted Y defines the original data word address, C defines the original character position within a word of nine bit characters, B defines the original bit position within a 9 bit character, and N defines either the number of characters or bits in the data string or a 4-bit code which specifies a register that contains the number of characters or bits. CN defines the original character number within the data word referenced by the data word address. TA defines the code that defines which type alpha-numeric characters are in the data, i.e., 9 bit, 6 bit, or 4 bit. TN defines a code which defines which type numeric characters are specified, i.e., 9 bit or 4 bit. S defines the sign and decimal type, that is leading sign-floating point, leading sign-scaled, trailing sign-scaled, or no sign-scaled. SF defines the scale factor, the scale factor being treated as a power of 10 exponent where a positive number moves the scaled decimal point to the right and a negative number moves the scaled decimal point to the left. The decimal point is assumed to be immediately to the right of the least significant digit.

Referring to FIG. 5, there is shown the decimal character execution unit (DECCU) 211, the execution unit of the present invention, in functional block diagram form. The DECCU 211 is the execution unit of the CPU 20 for a predetermined set of multiword instructions, including decimal arithmetic instructions, various character manipulation instructions, and instructions which operate on binary strings. The DECCU 211 is partitioned into two functional units, the character unit (DCU) 30 and the arithmetic unit (DAU) 40. The DCU 30 comprises two stages, a first stage 31, and a second stage 32. The DAU 40 comprises the third stage of the DECCU 211. The DECCU 211 receives operands from cache 201 and command information from instruction unit 202. The cache 201 and instruction unit 202 comprises the central unit 200 which is also operatively connected to main memory 21. Results from the DECCU 211 are transmitted to cache 201 (via the action of the collector 213 as discussed). The DCU 30 executes the character manipulation instructions including bit string instructions, and the DAU 40 executes the arithmetic instructions. The instructions executed by DECCU 211 are listed in Table 1. A complete description of each instruction is included in a Honeywell Software document entitled, "DPS 8 Assembly Instructions," copyright 1980 by Honeywell Information Systems Inc. (Order No. DH03-00), and can be referred to for more detailed information.

Figure 6:
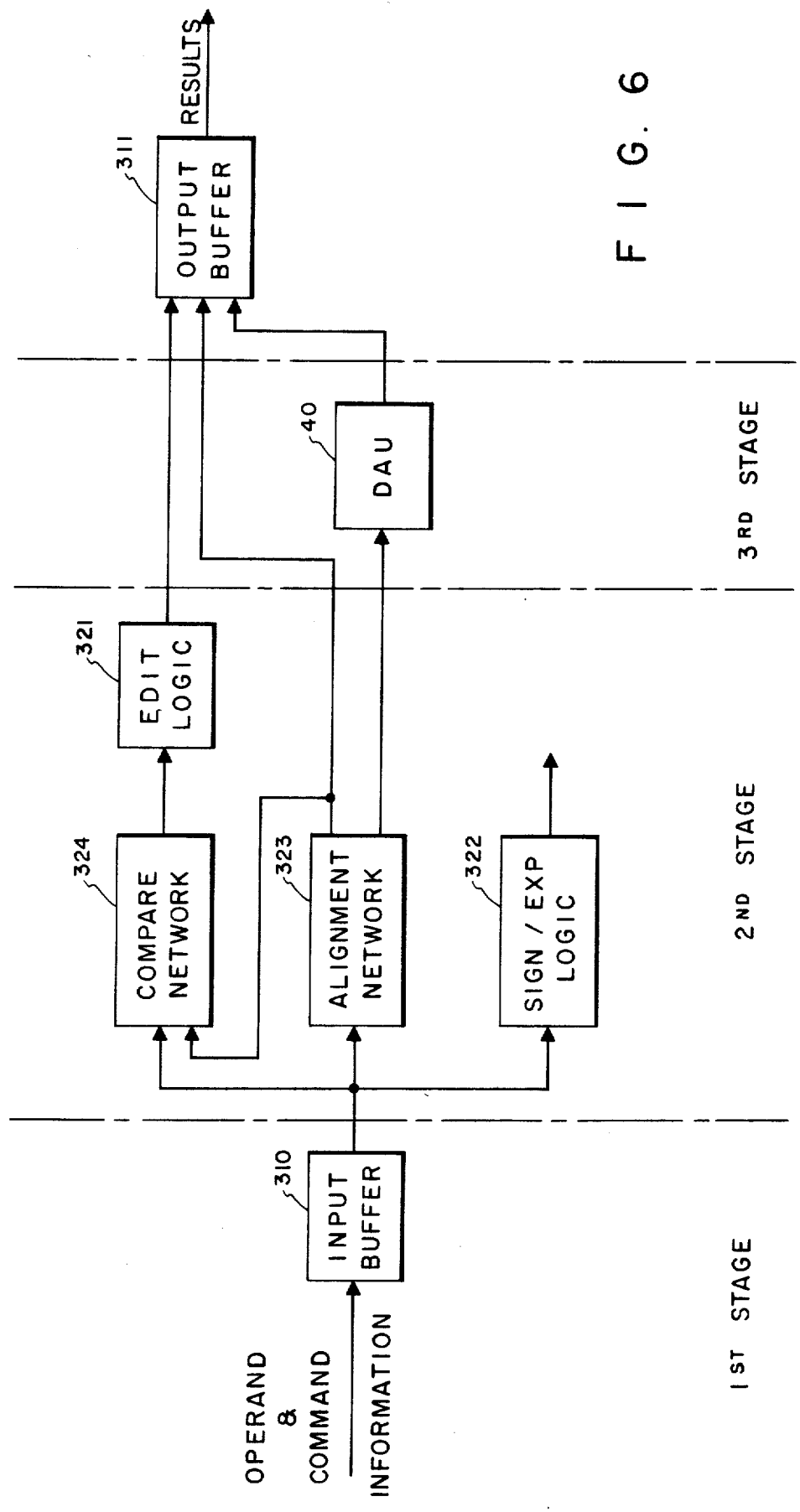
FIG. 6 shows a functional block diagram of the stages of the decimal character unit.

Referring to FIG. 6, a functional block diagram of the stages (or also referred to herein as levels) of the DECCU 211 is shown. The first stage 31 receives instruction and descriptor information from the instruction unit 202, and further receives the operand information from cache 201. The operands are stored in an input buffer 310 within the first stage 31, and the instructions are decoded and held in temporary registers and control flip flops of the first stage 31.

TABLE 1

| ALPHANUMERIC | |
|---|---|
| MLR | Move Alphanumeric LEFT to Right |
| MRL | Move Alphanumeric RIGHT to Left |
| MVT | Move Alphanumeric with Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reverse |
| SCM | Scan with Mask |
| SCMR | Scan with Mask in Reverse |
| EIS NUMERIC | |
| MVN | Move Numeric |
| CMPN | Compare Numeric |
| AD3D | Add Using Three Decimal Operands |
| AD2D | Add Using Two Decimal Operands |
| SB3D | Subtract Using Three Decimal Operands |
| SB2D | Subtract Using Two Decimal Operands |
| MP3D | Multiply Using Three Decimal Operands |
| MP2D | Multiply Using Two Decimal Operands |
| DV3D | Divide Using Three Decimal Operands |
| DV2D | Divide Using Two Decimal Operands |
| EIS BIT STRING | |
| CSL | Combine Bit Strings Left |
| CSR | Combine Bit Strings Right |
| SZTL | Set Zero and Truncation Indicator With Bit Strings Left |
| SZTR | Set Zero and Truncation Indicator With Bit Strings Right |
| CMPB | Compare Bit Strings |
| EIS CONVERSION | |
| DTB | Decimal to Binary Convert |
| BTD | Binary to Decimal Convert |
| EIS EDIT MOVE | |
| MVE | Move Alphanumeric Edited |
| MVNE | Move Numeric Edited |
| NEW EIS MULTIWORD | |
| CMPCT | Compare Characters and Translate |
| MRF | Move to Register Format |
| MMF | Move to Memory Format |
| TEN INSTRUCTIONS: EBCDIC/OVERPUNCHED SIGN CAPABILITY | |
| MVNX | |
| CMPNX | |
| AD3DX | |
| AD2DX | |
| SB3DX | |
| SB2DX | |
| MP3DX | |
| MP2DX | |

TABLE 1-continued

DV3DX
DV2DX
MVNEX  Move Numeric Edited Extended

Second stage 32 contains edit logic 321, sign/exp logic 322, alignment network 323, and compare network 324 required to perform the character manipulation and alignment operations. The output of the second stage 32 is either the final result which is transmitted to an output buffer 311 to be stored in cache 201, or is aligned data passed to the DAU 40. The DAU 40, which comprises the third stage of the DECCU 211, performs the arithmetic operation on the aligned data (arithmetic operation may also be referred to herein as numeric execution). Each stage of the DECCU 211 will be described in detail hereinunder.

Figure 7:
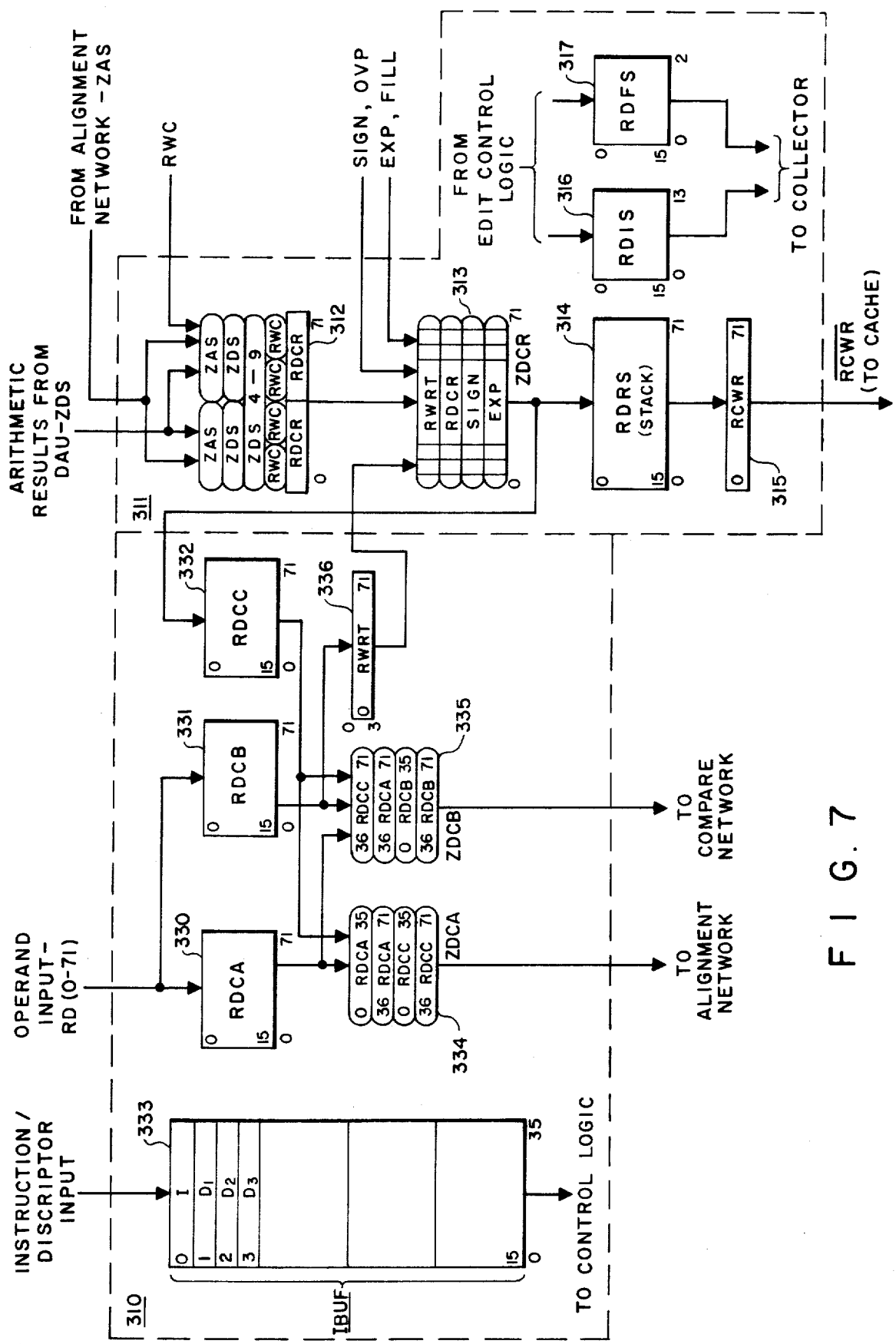
FIG. 7 shows a functional logic diagram of the input buffer and output buffer of the preferred embodiment of the present invention.

The input buffer 310 and output buffer 311 of the preferred embodiment is shown in FIG. 7. The input buffer 310 comprises a first and second operand input stack, RDCA and RDCB 330 and 331, respectively (also referred to as stack A and stack B, respectively), a third stack RDCC 332 (also referred to as stack C), and an instruction/descriptor input buffer 333, IBUF. A first and second switch 334 and 335 (also denoted as the ZDCA and ZDCB switches, respectively) is included as part of input buffer 310. First switch 334 is operatively connected to stack A 330 and stack C 332 for transferring selected data, ZDCA, to alignment network 323. Second switch 335 is operatively connected to stack A 330, stack B 331, and stack C 332 for transferring selected data ZDCB to compare network 324. A rewrite register 336, RWRT, is operatively connected to stack B 331, the output of RWRT being connected to output buffer 311. The loading of IBUF 333, and the operand input stacks 330, 331 is from CUPS 204 and cache 201, respectively under the control of CUPS 204.

The IBUF 333 is a 16 word by 36 bit wraparound buffer. Upon receipt of an instruction available signal from CUPS 204, an instruction/descriptor word is read into the corresponding location of IBUF 333. IBUF is organized in 4 four-word blocks, thereby capable of storing up to a maximum of four instructions at a time. The first word of the block is for storing the instruction word I, the second word of the block is for the first descriptor word D1, the third word of the block is for the second descriptor word D2 and the fourth word of the block is for the third descriptor word, if any. The information contained in the instruction/descriptor words is transferred to the various control logic for the generation of control signals to effect the execution of the functions required to execute the instruction. An IBUF-full control signal is sent to CUPS 204 when IBUF 333 is full. The format of the instruction/descriptor words and the significant control signals will be described in conjunction with the operation of the logic of the DECCU 211 in detail hereinunder.

Operand input data (also denoted by signal name RD) is loaded into stack A 330 and stack B 331 as a function of the instruction. In the preferred embodiment, stack A 330 and stack B 331 are each 16 word×72-bit memory devices. Double word writes are made into the operand stacks 330, 331 and can hold operands awaiting execution for a maximum of 4 instructions. When the DECCU 211 receives a control signal from CUPS 204 indicating operands are available, the operands are fetched by doubleword reads. The input operands are loaded into stacks A and B 330, 331 according to steering control signals. An operand full control signal is transmitted to the CUPS 204 from the DECCU 211 when either operand stack is full. A stack full signal from stack A 330 and a stack full signal from stack B 331 is ORed to generate the operand full control signal to CUPS 204. Operand 1 data is loaded into stack A 330, and operand 2 data is loaded into stack B 331 for character type instructions. Operand 1 and operand 2 data are loaded into stack A 330 for numeric-type instructions (instructions sometimes being referred to as operations or OPS). Rewrite data and translated data are loaded into stack B 331. The loading of the operands into the operand stacks is selected according to the instructions as shown in Table 2.

TABLE 2

| DECCU Instruction | Stack A RDCA | Stack B RDCB |
|---|---|---|
| MLR,MRL | OP1 | OP2 |
| MRF,MMF | OP1 | — |
| MVT | OP1 | OP2,OP3 |
| MVE,MVNE | OP1 | OP2,OP3 |
| TCT,TCTR | OP1 | OP2 |
| SCM,SCD | OP1 | OP2 |
| CMPC | OP1 | OP2 |
| CMPCT | OP1 | OP2,OP3 |
| CSL,CMPB,SZTL | OP1 | OP2 |
| DTB | OP1,OP2 | — |
| BTD | OP1 | OP2 |
| MVN | OP1,OP2 | OP2 |
| AD2D,MP2D | OP1,OP2 | OP2 |
| AD3D,MP3D | OP1,OP2 | OP3 |
| CMPN | OP1,OP2 | — |
| LPL,SPL | OP1 | — |

Operand data can be read from stack A 330 a double word at a time if it is to be packed 9-bit to 4-bit. This can occur with unpacked numeric operands and the MLR and MRL instructions. Otherwise the operand data is read on a single word basis. Operands from stack B 331 are single word reads. Rewrite data from stack B 333 is loaded into the RWRT (the rewrite register) 336 by a double word read. It can be seen that either a double word can be selected from stack A 330 or two single words from stack A 330 and B 331 by the ZDCA and ZDCB switches 334, 335, but not both.

DECCU numeric results are stored in stack 332 as well as result stack RDRS (the result stack will be described in detail hereinunder in conjunction with the output buffer 311) in case the result is to be one of the input operands for a numeric instruction immediately following. The normal operand fetches for that operand are cancelled, and that operand is read instead from stack C 332 thereby eliminating the delay introduced by a store-load break. Wraparound data from stack C 332 can be read on either a double word or single word basis just as if the operand were in stack A 330. The selected operand data, ZDCA and ZDCB, are sent to the alignment network 323 for alignment, to the compare network 324 for character comparison and selection, and to the sign/exp logic 322 to extract signs and exponents.

The control logic (not shown) generates the read and write addresses for the stack A 330, stack B 331, and stack C 332. The control logic also generates the select controls for the ZDCA and ZDCB switches 334, 335. In addition, the control logic generates data available signals that allow the input registers of the alignment network 323 and the compare network 324 to be loaded. The control logic signals the CUPS 204 when ten or more locations in either stack A 330 or stack B 331 are used to prevent writing over good data.

The output buffer 311 comprises a 1-of-4 select double word register 312 (more simply referred to as the RDCR register), having inputs ZDS, arithmetic results from DAU 40, ZAS from alignment network 323, and resultant output from edit logic 321 (RWC register to be discussed hereinunder). An output buffer select switch 313 (or more simply referred to as ZDCR switch) receives inputs from RDCR register 312, RWRT register 336, the sign, OVP data from sign/exp logic 322, and the EXP, FILL data from compare network 324. The data selected by the ZDCR switch 313 is stored in a results stack RDRS 314. The results stack RDRS 314 is a 16 word by 72 bit memory device or stack. The results stack 314 stores data to be stored in cache 201 via a RCWR register 315. The output buffer 311 also includes an indicator results stack 316 and a fault results stack 317. Indicator results stack 316 is a 14 bit × 15 high stack, and fault results stack 317 is a 3 bit × 15 high stack. Inputs are received from execution control logic and output results are transferred to the collector 213.

The format of the DECCU instruction/descriptor words is shown in FIG. 8. The words are generated by the CUPS 204 in the format shown. The instruction word includes the scale factor and sign information of the first operand. This format is important from timing considerations which will be described in detail hereinunder. SF, indicates scale factor for numeric operands. TYP identifies the data type as follows: 00 for 9-bit format, 01 for 6-bit data, and 10 for 4-bit data. SN indicates sign and decimal type for numerics. SEQ# indicates a sequence number and FILL is the fill character field. DCW indicates position within double word of first character, BP indicates position within first byte of first bit, and W indicates this operand is in stack C 332. Ln indicates the length of operand n, Zn is set if LN is zero, and Gn is set if Ln is greater than 256.

Figure 9:
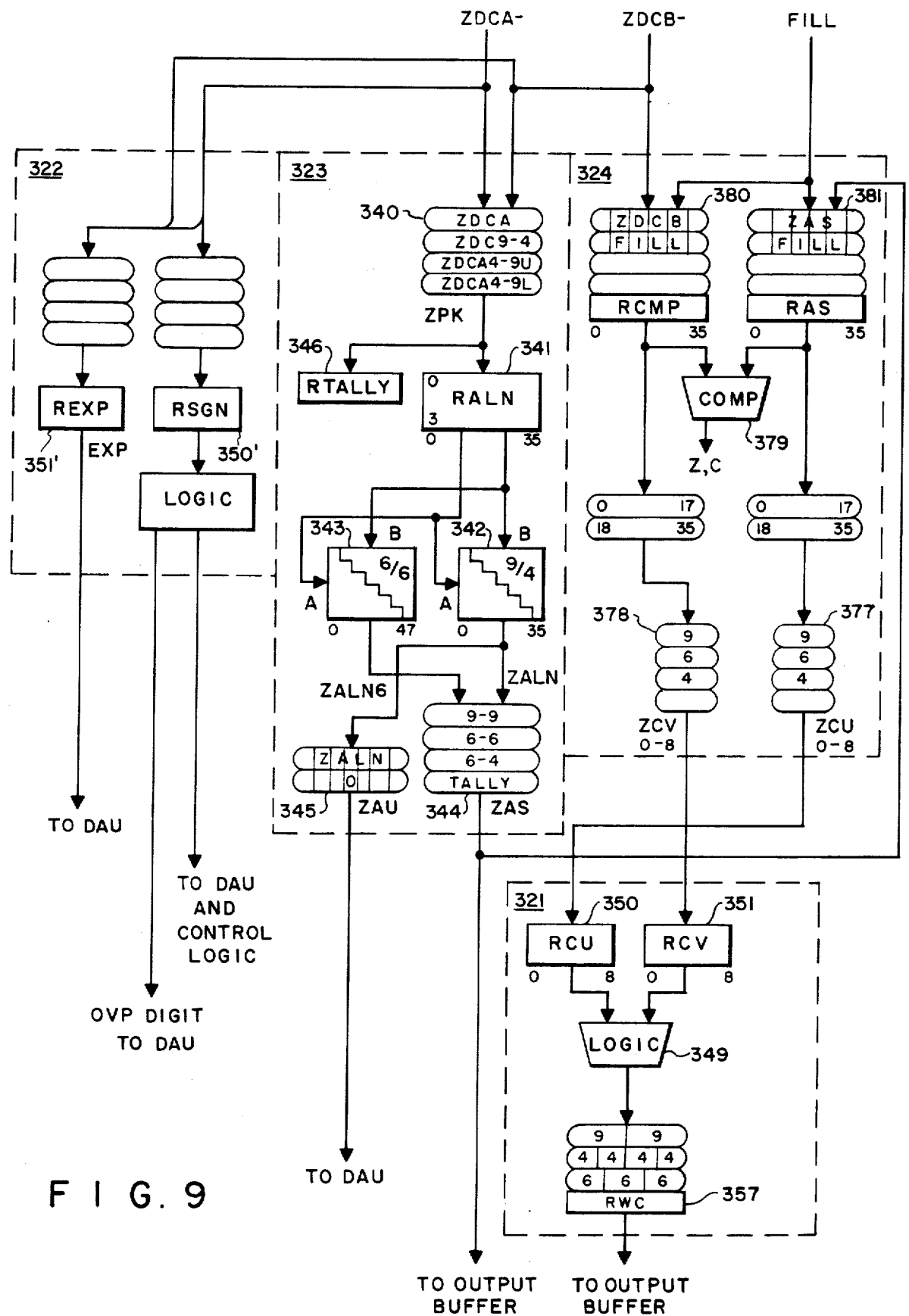
FIG. 9 shows a functional logic diagram of the second stage of the decimal character unit of the preferred embodiment of the present invention.

A system logic diagram of the second stage of DECCU 211 is shown in FIG. 9. The second stage, the execution stage for character-type instructions, comprises the alignment network 323, compare network 324, sign/exp logic 322, and edit logic 321. The second stage receives operand input data ZDCA and ZDCB via first stage ZDCA switch 334 and ZDCB switch 335. More specifically, operand input data ZDCA and ZDCB is inputted to an input alignment switch 340 (or more simply denoted the ZPK switch) of the alignment network 323, and an input sign switch 350' and an input exponent switch 351' of sign/exp logic 322. Input operand data ZDCB is inputted to a first 1-of-4 select register 380 (or more simply denoted the RCMP register) of compare network 324. The FILL character data is inputted (from a register of the control logic (not shown) which contains the FILL character data for the instruction being executed, which is included in the instruction word, or I word) to a second 1-of-4 select register 381 (or more simply denoted the RAS register) of compare network 324 and the first 1-of-4 select register 380. The output of the second stage is either the final result of an operation which is transmitted to the output buffer 311, or is aligned data transmitted to the DAU 40 for an arithmetic operation.

The alignment network 323 comprises the ZPK switch 340 operatively coupled to an alignment register 341 (or more simply the RALN register). The RALN register is coupled to a 9/4 shift network 342 and a 6/6 shift network 343. The 9/4 shift network 342 and the 6/6 shift network 343 are in turn coupled to a first alignment output switch 344 (or more simply the ZAS switch), and a second alignment output switch 345 (or more simply the ZAU switch). A register, RTALLY 346, is utilized to maintain a tally count which will be described further hereinunder.

Compare network 324 includes the RCMP register 380 and the RAS register 381 for storing operand 1 (OP1) and operand 2 (OP2). A comparator 379 is included which compares OP1 to OP2 and outputs a zero and carry signal (Z and C). The OP1 and OP2 data are passed to respective output switches 377 and 378, denoted ZCU switch and ZCV switch, respectively.

The edit logic 321 receives the ZCV and ZCU data into respective RCV register 351 and RCU register 350. The data is combined by logic 349 to operate on the data to effect execution of the instruction. The data is then formatted in results register 357 RWC and transferred to the output buffer 311. The sign/exp logic 321 provides the logic for extracting the sign and exponent. A more detailed description of the logic of the second stage of the DECCU 211 is provided hereinunder.

Still referring to FIG. 9, the ZPK switch 340 of alignment network 323 packs a double word of 9-bit data into a single word of 4-bit data. It also unpacks MLR and MRL data for the MLR and MRL operation. The various data formats that are produced by the ZPK switch 340 are shown in Table 3. All input data is ZDCA data except for the right half of switch position 1 which is packed ZDCB data. PD bits are digits parity bits which are carried thru the alignment network with packed data. Switch position 0 is 9-bit with byte parity, switch position 1 is pack 9-4, switch position 2 is unpack 4-9 upper, switch position 3 is unpack 4-9 lower, switch position 4 is 4-bit with digit parity, and switch positions 5-7 are unused.

TABLE 3

| Switch Position | Byte 0 | Byte 1 | Byte 2 | Byte 3 |
|---|---|---|---|---|
| 0 | 0(1–4) (5–8)P0 | 9(10–13) (14–17)P1 | 18(10–22) (23–26)P2 | 27(28–31) (32–35)P3 |
| 1 | ZDCA PD1(5–8) (14–17)PD3 | ZDCA PD5(23–26) (32–35)PD7 | ZDCA PD1(5–8) (14–17)PD3 | ZDCA PD5(23–26) (32–35)PD7 |
| 2 | 0-0 (14–17)PD3 | 0-0 (1–4)PD0 | 0-0 (5–8)PD1 | 0-0 (10–13)PD2 |
| 3 | 0-0 (32–35)PD7 | 0-0 (19–22)PD4 | 0-0 (23–26)PD5 | 0-0 (28–31)PD6 |
| 4 | PD6(28–31) (32–35)PD7 | PD0(1–4) (5–8)PD1 | PD2(10–13) (14–17)PD3 | PD4(19–22) (23–26)PD5 |

The alignment register 341 comprises a 4 deep × 36 bit register denoted as register position (or location) 0 through 3. The alignment register 341 holds the operands until they can be aligned. Alphanumeric operands for character ops use only location 0 of the 4-deep register. Operand 1 of numerics and alphanumeric word ops use locations 0 and 1. Operand 2 for numerics uses locations 2 and 3. In general, an operand word is read twice.

Operands are always loaded beginning with location 0 or 2. Control signals select the registers for the dual readouts from RALN (0-3) 341. Numeric data is loaded into RALN 341 as follows assuming all data is present:

| Cycle | Load |
|---|---|
| 1 | 1st of OP1 into R0 |
| 2 | 1st of OP2 into R2 |
| 3 | 2nd of OP1 into R1 |
| 4 | 3rd of OP1 into R0 |
| n | last of OP2 into R3 |
| n + 1 | last − 1 of OP2 into R2 |

The 9/4 shift network 342 comprises a plurality of shifters configured to align 9 or 4 bit for data format combinations of 9 to 9, 4 to 4, 9 to 4, and 4 to 9. The 6/6 shift network 343 is a second shift network configured to shift data words of the six-bit character format to a data word also having a six-bit character format, or to shift data words the six-bit character format to a data word having a four-bit character format. A detailed description of 6/6 shift network 343 and 9/4 shift network 342 can be found in pending U.S. Patent Applications entitled, "Apparatus for Aligning and Packing a First Operand Into a Second Operand of a Different Character Size," by Donald C. Boothroyd et al, Ser. No. 394,952, filed on July 2, 1982; and "Data Alignment Circuit," by Donald C. Boothroyd et al, Ser. No. 394,951 filed on July 2, 1982; respectively, both applications being assigned to the same assignee as the present application, and both applications incorporated by reference herein.

Figure 10:
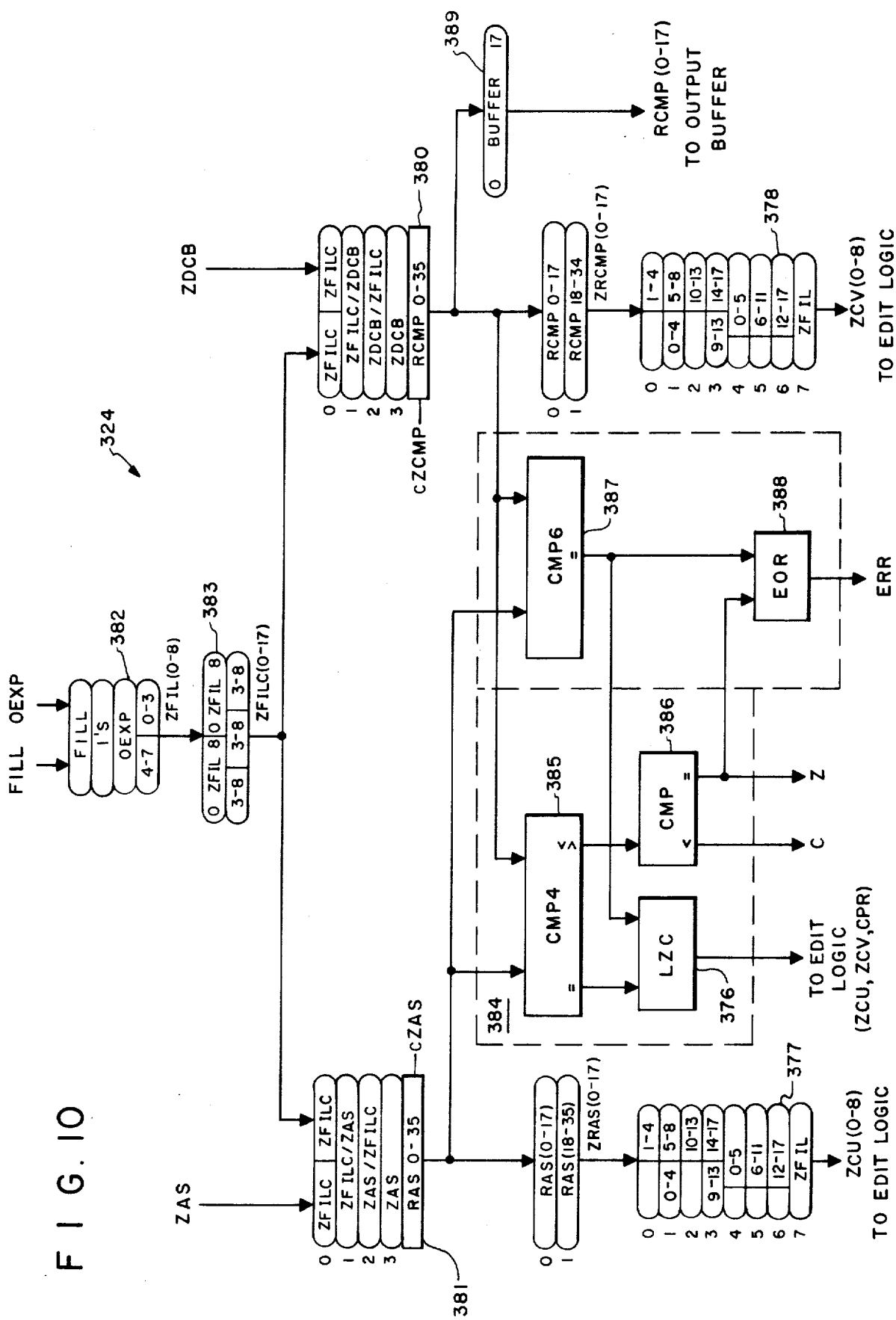
FIG. 10 shows a functional logic diagram of a compare network.

Referring to FIG. 10, there is shown a functional logic diagram of the compare network 324. Magnitude comparison for the CMPC and CMPCT instructions is performed a word at a time by the compare network 324. The comparison logic can handle 4, 6, and 9-bit character data strings, but both data strings being compared must have the same data type. Both ends of both strings are padded with the FILL character to a word boundary. The comparison process stops when an inequality is found or when both data strings exhaust. For the CMPCT instruction, the character number which caused a miscompare is determined and registered. That character from each string is read out to the CUPS 204 to index a translate table. When the two translated characters are received by the DECCU 211 they are compared by the edit logic 321 to set indicators (not shown), the indicators being flip/flops well known in the art. Character ops such as edits, scans, translates, and bit-strings are executed one character at a time by the edit logic 321. The RAS and RCMP registers 381, 380 hold a word of operand 1 (OP1) and operand 2 (OP2), respectively. One character from each string is selected and sent to the edit logic 321 for execution. The results are collected a half word at a time in RWC 357 of edit logic 321 and collected into a double word in RDCR 312 of output buffer 311 before being loaded into result stack RDRS 314.

The RAS and RCMP registers 381, 380 of the compare network 324 are identical 40-bit registers used to hold operands for comparison or character extraction. The RAS and RCMP registers 381, 380, and the associated RAS and RCMP switches are divided by 12 sections to provide the capability of selecting various characters, the operation of the switch described below. OP1 is loaded into RAS 381 from the alignment network 323 and OP2 is loaded into RCMP 380 from stack B 331. For the CMPC and CMPCT instructions, OP1 is aligned to OP2. The RAS and RCMP registers 381, 380 include an input switch to insert FILL on a character basis. The Fill character ZFIL (bits 0-8) is either the 9 or 6 bit FILL or two copies of the 4-bit digit FILL determined by ZFIL switch 382. The FILL character is replicated in a ZFILC switch 383, outputting signal ZFILC (bits 0-17), so that FILL can be inserted at any character position. All 1's can also be selected for the MRF and MMF instructions for sign extension. For numerics, the result exponent OEXP is either the even or odd digit position can be selected. This exponent or FILL for MLR is registered in RCMP 380 and is sent to the output buffer 311 via buffer 389 for insertion into the result string. An enable mask is generated by the controller (not shown) for each operand and the mask is converted to switch controls depending on the character type. For all character ops the masks are fully enabled. These switch controls for RAS 381 and RCMP 380 are cZAS (0-11) and cZCMP (0-11), respectively. The corresponding controls for each character are shown in Table 4. For example, to enable 9-bit byte #2 c6, c7, and c8 are enabled. To enable 6-bit characters #0 and #1, c0, c1, c2, and c4 are enabled.

TABLE 4

| Type | cZAS, cZCMP | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 9-bit | 0 | 0 | 0 | 1 | 1 | 1 | 2 | 2 | 2 | 3 | 3 | 3 |
| 4-bit | 0 | 1 | 1 | 2 | 2 | 3 | 4 | 5 | 5 | 6 | 6 | 7 |
| 6-bit | 0 | 0 | 1 | 2 | 1 | 2 | 3 | 3 | 4 | 5 | 4 | 5 |

Two comparison networks comprise the comparator 379 and are used in parallel to compare the data of RCMP 380 with RAS 381. The first comparison network 384 is a two stage network for magnitude comparison of the two operands. Its outputs DCMPC-Z and DCMPC-C (or more simply denoted Z and C) are used to set Zero and Carry indicators. The first stage 385 (CMP4) consists of 8 separate digit comparators. The second stage 386 (CMP) compares the digit comparator outputs of the first stage 385. This arrangement allows the non-equal digit or 9-bit byte to be located for the CMPCT instruction. The 9th bit of each byte for packed 4-bit data is forced to zero by a ZNULL switch (not shown). The second comparison network 387 (CMP6) is an equality comparator. It is partioned into six 6-bit bytes to determine the non-equal byte for the CMPCT instruction. In addition, its six "equal" outputs are combined and compared to the "equal" output of the first comparison network 384 for a hardware error check in exclusive −OR gate (EOR) 388. The error circuitry of the DECCU 211 is not discussed further herein since it is not vital to an understanding of the invention.

Character extraction for character ops includes the use of a counter to keep track of the character position and a switch to select the character from the word. A first control counter controls the ZCU character selection for OP1 and a second control counter controls ZCV to select the character from OP2, the control counters being included in the controller (not shown). The first and second control counters are loaded with the starting character position CN from the instruction buffer 333. The CN data points to the right end of the string for reverse instructions. The first and second control counters are incremented by 1 or 2 depending on character type by control signals from the edit logic controller. The selected 4, 6, or 9-bit character is right justified within the ZCU switch 377 and ZCV switch 378 and is outputted to edit logic 321. The FILL character is selected when the string exhausts by enabling control bits 1-3 of the respective switch to select position 7 of the switch. When an unequal comparison is found, it is reported to the edit control logic. In addition the strobing of RAS 381 and RCMP 380 are inhibited to preserve the comparison results. During this same non-comparison cycle the first non-equal character position is loaded into two control registers FcZCU and FcZCV, (not shown). First, an inspection is made to determine which half word is unequal. Then, a leading zero count of character equals is generated by a leading zero counter logic (LZC) 376 to give the character position. This registered character position controls the character selection switches ZCU and ZCV so that the miscompare characters can be routed to the edit logic 321.

Figure 11:
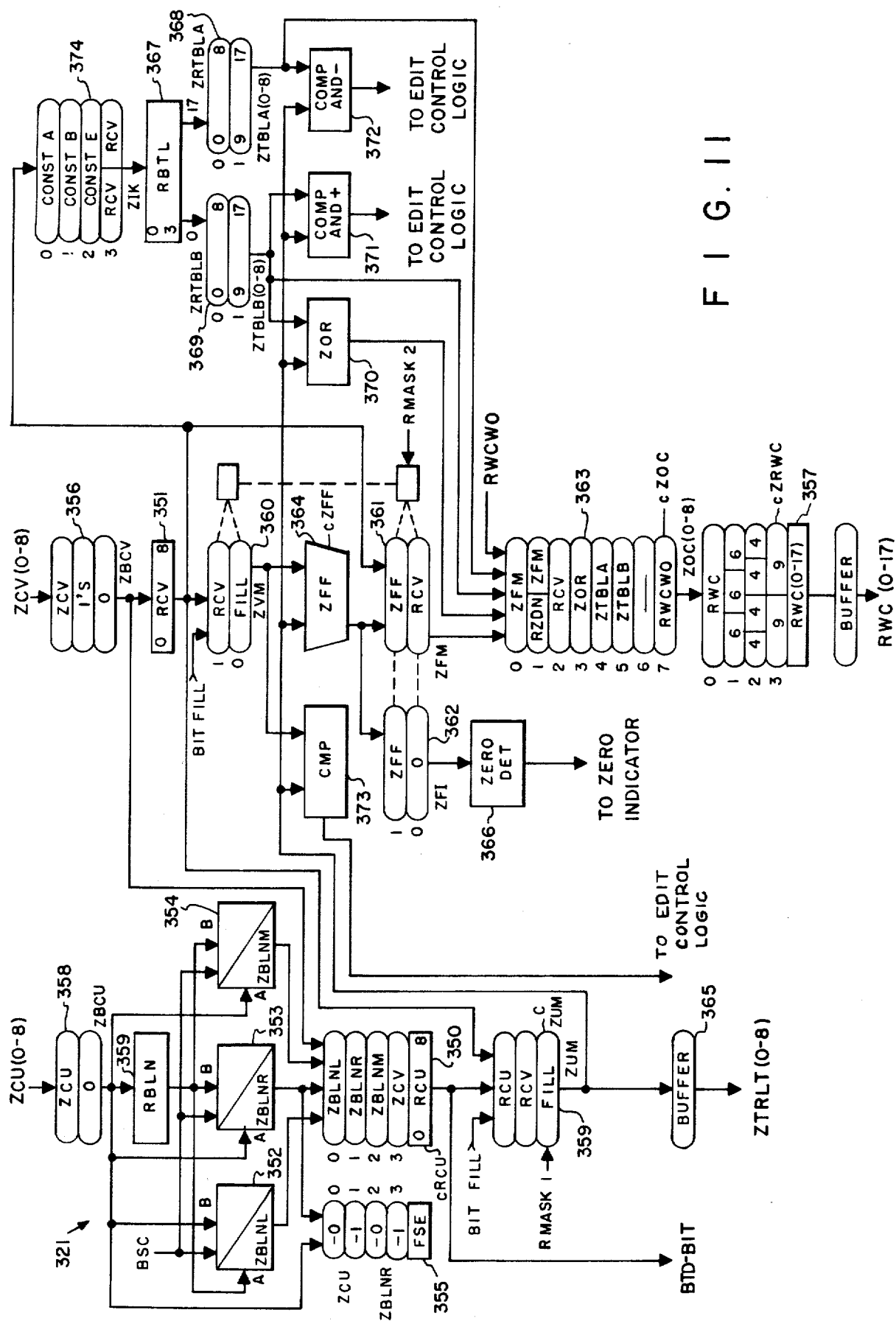
FIG. 11 shows a functional logic diagram of edit logic.

Referring to FIG. 11, there is shown a functional logic diagram of edit logic 321. The OP1 character selected by ZCU switch 377 is sent to a RCU register 350 of the edit logic 321 for processing. For most instructions RCU 350 can be strobed by a control signal when the following conditions exist:

data is available in RAS 381 and
no hold due to lack of rewrite data or the result stack being full and
RCU 350 is ready to accept another character.

(The control signals will be identified in detail hereinunder.) For scans, edits, and bitstrings where there are two source operands, data must be available in both RAS register 381 and RCMP register 380. Similarly the OP2 character selected by ZCV switch 378 is registered in a RCV register 351 of edit logic 321 if an equivalent control signal is present. Again scans, edits, and bitstrings can only proceed if data is available in both RAS register 381 and RCMP register 380.

The source characters (or FILL) are normally loaded into RCU and RCV 351 unchanged. Character execution occurs during the next cycle. The ZCU character is shifted by zero in a first shifter ZBLNL 352, and loaded into RCU 351, the shifters having an A and B input. The exceptions to this are the bitstrings, MRF, MMF, and BTD instructions discussed in further detail hereinunder.

The bit string instructions bit align OP1 relative to OP2. The forward instructions CSL, SZTL, and CMPB shift the ZCU character by 0 to b 8 bits in first shifter ZBLNL 352. The reverse instructions CSR and SZTR are shifted in a second shifter ZBLNR 353 for which the bit alignment register RBLN 359 is applied to the A side of the shifter. A bit shift count BSC is equal to the difference in bit pointers BP2-BP1. If a negative shift count results, a nine must be added to give correct alignment.

The MRF instruction uses the ZBLNR shifter 353 to load ZCU unchanged into the RCU register 350 if the "B bit" is a "0" by using a shift of zero. (The "B" bit is bit 1 of the computer instruction word.) OP1 is moved from right to left. IF the "B bit" is a "1" a 9-8 packing occurs in a third shifter ZBLNM 354. The bit shift count begins with 0 and is incremented by 1 after every byte is shifted. The first output (BSC=0) is discarded. This is illustrated as follows:

| Cycle | Shift Count | ZBLNM |
|---|---|---|
| 1st shift | BSC = 0 | [1 RBLN 8] [0] |
| 2nd shift | BSC = 1 | [ 8 $ZCU$] [1 RBLN 8] |
| 3rd shift | BSC = 2 | [7 $ZCU$ 8] [1 RBLN 7] |
| 4th shift | BSC = 3 | [6 $ZCU$ 8] [1 RBLN 6] |
| 5th shift | BSC = 4 | [5 $ZCU$ 8] [1 RBLN 5] |

In addition to the packing data, MRF also can specify that the sign of the last byte moved be extended to complete the result string. When OP1 exhausts, all 1's are inserted into the ZCU data from compare network 324 as the FILL character. If the sign bit of the last byte moved which is held in a FSE register 355 is a "1", the ZCU FILL is enabled. Otherwise, it is inhibited in ZBCU switch 358 to zero fill the remaining bytes.

The MMF instruction uses the ZBLNR shifter 353 to load ZCU into the RCU register 350. If the "B bit" (bit 1 of the instruction) is a "0", the data is unchanged and the bit shift count of 9 is used throughout. If the "B bit" is a "1" an 8-9 bit unpacking occurs. The bit shift count begins with 9 and is decremented by 1 after every byte is shifted as illustrated as follows:

| Cycle | Shift Count | ZBLNR | |
|---|---|---|---|
| 1st shift | BSC = 9 | [1 ZCU | 8] |
| 2nd shift | BSC = 8 | [1 ZCU 8] | [ RBLN 0] |
| 3rd shift | BSC = 7 | [2 ZCU 8] | [0 RBLN 1] |
| 4th shift | BSC = 6 | [3 ZCU 8] | [0 RBLN 2] |
| 5th shift | BSC = 5 | [4 ZCU 8] | [0 RBLN 3] |

The ZCU input is the right most byte during the 1st shift, right −1 byte during the 2nd shift, etc. The decreasing shift count indicates that the string must be expanding. A "0" is gated into bit 0 of every byte one cycle later. ZCU data will be sign extended as for MRF. ZCV data will be forced to all 1's or 0's in a ZBCV switch 356 according to the sign of the last byte moved. An overflow is detected on the following cycles if the contents of RCU 350 and RCV 351 are not equal. The BTD instruction loads the ZCU data into the RCU register 350 via the ZBLNR shifter 353. The same ZCU character is held for 9 cycles while the bit shift count is decremented by 1 from 9 to 1. This picks off one bit at a time beginning with the MSB for conversion by the DAU 40. Bit 0 of the RCU register 350 is selected as BTD-BIT. The CMPCT instruction will translate 1 or 2 characters if word comparison finds the two strings do not compare equal. These characters to be translated are the characters transferred to the RCU 350 and RCV 351 registers which were determined by the character position data from the LZC 376 discussed above. The character position data is utilized for the generation of control signals to operate the respective ZCU 377 and ZCV 378 switches. The character from OP1 is loaded into the RCU register 350 and the character from OP2 is loaded into RCV register 351. The translated characters are selected from the RCMP register 380 by ZCV. Position 3 of the RCU input switch selects the translated OP1 character while the translated OP2 character is loaded into RCV 351. Character comparison takes place the following cycle to determine final indicator settings.

Characters in RCU 351 and RCV 350 are used during the execution cycles to build a result string in a result register 357 (RWC) and to determine indicator settings. Character pointers are incremented and lengths are decremented until exhaust flags signal the end of the instruction, DTERM. In general, one OP1 character can be executed every cycle, so string lengths determine the instruction execution time.

Figure 12:
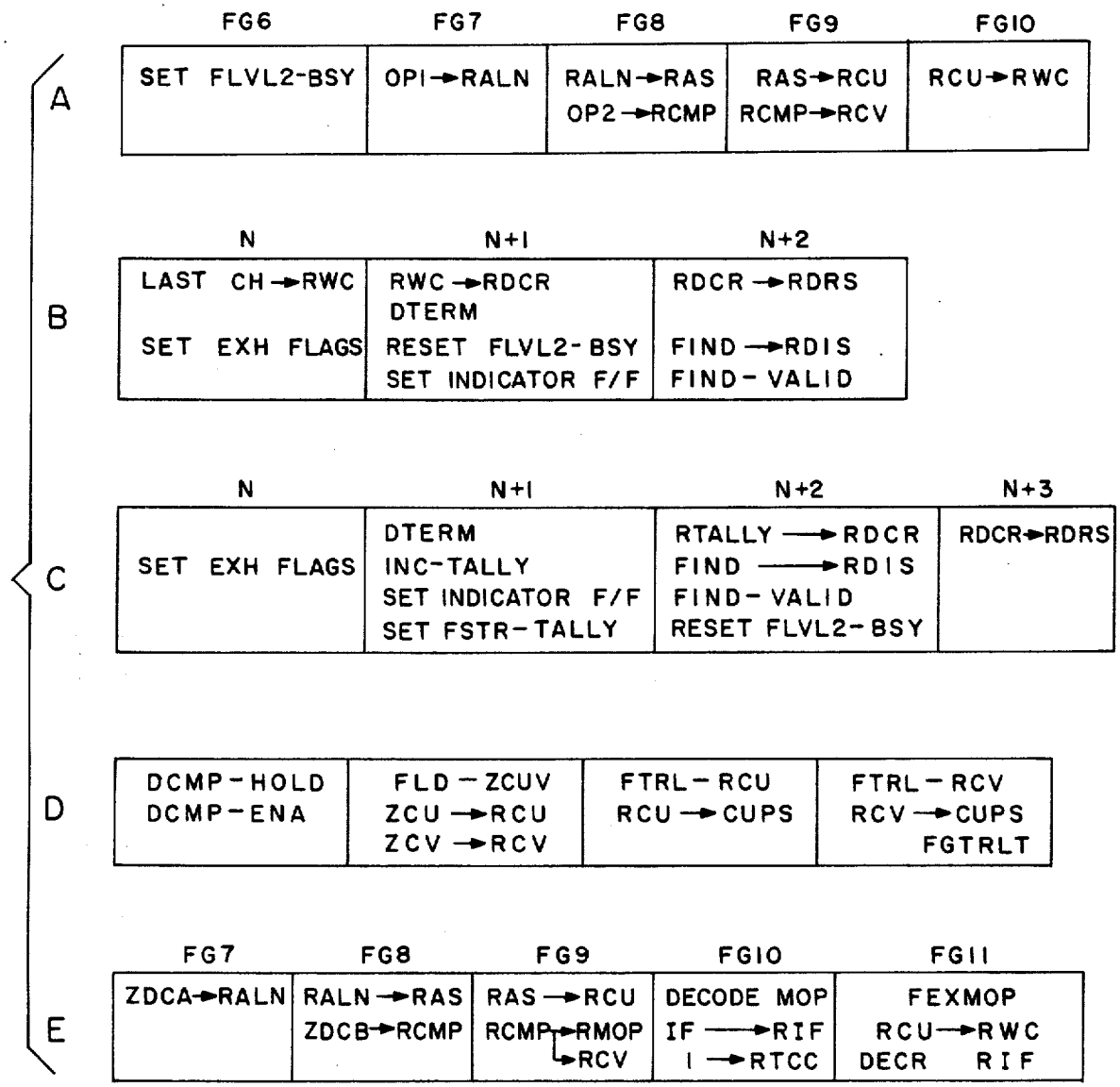
FIG. 12 shows execution cycles of various instructions executed by the DECCU of the present invention.

The first execution cycle is during an execution cycle denoted FG10 because data is not available in RCU 350 and RCV 351 until then as shown in FIG. 12A. The 5 execution cycles will be discussed in further detail hereinunder. When the Nth character has been executed and that terminates the instruction, a termination sequence begins. This varies somewhat depending upon the instruction. The most general sequence is shown in FIG. 12B. Exhaust and comparison flags are set when the Nth character is executed. These flags are used to set indicators, and DTERM resets various busy and control F/F's. On N+2 data, indicator, and fault results are loaded into the indicator result stack RDIS 316 and fault result stack RDFS 317, and set/reset (S/R) of indicators are sent to the CUPS 204. This cycle can be FG6 of the next EIS instruction if it were stacked up waiting to be executed. Instructions that store a tally count for the results (Scans and TCT) require one additional cycle as shown in FIG. 12C.

A brief discussion of the operations performed for each instruction is given in the following paragraphs. A summary of the control status for the edit logic 321 to execute various instructions is given in Table 5.

TABLE 5
EDIT LOGIC CONTROL STATES

| INSTRUCTION | cRCU | BSC | cZUM | RMASK1 | RMASK2 | cZFF | cZOC |
|---|---|---|---|---|---|---|---|
| MLR, MRL | 0 | 0 | 0 | 777 | — | 00 | 0 |
| MRF B = 0 | 1 | 0 | 0 | 777 | — | 00 | 0 |
| MRF B = 1 | 2 | 0,1,2,3 | 0 | 777 | — | 00 | 0 |
| MMF B = 0 | 1 | 9 | 0 | 377 | 377 | 00 | 0 |
| MMF B = 1 | 1 | 9,8,7,5 | 0 | 377 | 377 | 00 | 0 |
| CSL,SZTL,CMPB | 0 | BP2-BP1 | 0 | OP1 | OP2 | VAR. | 0 |
| CSR,SZTR | 1 | BP2-BP1 | 0 | OP1 | OP2 | VAR. | 0 |
| MVT | 0 | 0 | 0 | 777 | — | — | 2 |
| TCT,TCTR | 0 | 0 | 0 | 777 | — | — | 2 |
| CMPCT FGTRLT | 0 | 0 | 0 | 777 | 777 | — | — |
| CMPCT FGTRLT | 3 | 0 | 0 | 777 | 777 | — | — |
| BTD | 1 | 9-1 | 0 | 777 | — | — | — |
| BTB | — | — | — | — | — | — | 7 |
| SCM,SCMR | 0 | 0 | 0 | MASK | MASK | 11 | — |
| SCD,SCDR | 0 | 0 | 0 | 777 | 777 | 11 | — |
| MVE,MVNE | 0 | 0 | 0 | 777 | 777 | 00 | VAR. |

CHARACTER MOVES MLR, MRL FOR 9-6, 6-9, 4-6

Still referring to FIG. 11, the character stored in RCU 350 is transferred into RWC 357 unchanged via a ZUM, ZFF, ZFM and ZOC path. A ZUM switch 359 outputs ZUM data, a ZVM switch 360 outputs ZVM data, and likewise for ZFM switch 361, ZFI switch 362, and ZOC switch 363. ZUM switch 359, ZVM switch 360, ZFM switch 361, and ZFI switch 362 are divided vertically by nine-bits for masking and filling at the bit level. ZOC switch 363 is a character output string. ZFF 364 is a boolean function network which performs sixteen boolean operations on bit strings. The ZFF network 364 comprises two ALUs similar to the Texas Instrument ALU integrated circuit TI SN74181. The "U" path and the "V" path for the operands have associated therewith a U, V, and W character control counter (not shown) (RUCNT, RVCNT, and RWCNT, respectively RWCNT being the resultant character control counter) which points to the current character of the string. The U and W counters are incremented for a left to right operation (or decremented for a right to left operation). The quantities L1 and L2, denoting the dynamic lengths of OP1 and OP2 maintained in pointer and length control logic of the controller, are decremented. Finally, FILL is selected by ZCU 377 when the quantity L1 exhausts.

| Cycle N: | FEXH2 = 1 |
|---|---|
| Cycle N + 1: | DTERM = FL2EQ0 = 1 |
| Cycle N + 2: | FLVL2-BSY = 0, FIND-VALID = 1 |

MOVE TO REGISTER FORMAT MRF

The character stored in RCU 350 is transferred into RWC 357 via ZUM 359, ZFF 364, ZFM361, and ZOC 363. Packing and sign extension are performed as discussed above relative to the transfer of OP1 character to RCU 350 and the transfer of the OP2 character to RCV 351. The results of the first character execution cycle FG10 are discarded by the control signal MRF-HOLD. Since the L2 quantity can specify a maximum of 4 bytes, a maximum of 5 execution cycles can occur.

| Cycle N: | FEXH2 = 1 |
|---|---|
| Cycle N + 1: | DTERM = FL2EQ0 = 1 |

MOVE TO MEMORY FORMAT MMF

The character stored in RCU 350 is transferred to RWC 377 as discussed above for the MRF instruction. After the last character is moved to RWC 357 to complete the result string, the strobing of RWC 357 is inhibited but execution continues. Comparison is then made between ZUM data and ZMV data until OP1 plus any residue in RBLN 359 exhausts. If the "EC" bit (enable check bit is bit 0 of the instruction word) is true, an overflow indicator OVFL will be set if ZUM data and ZVM data were unequal.

| Cycle N: | FL1EQ0 = 1 |
|---|---|
| Cycle N + 1: | FFL1EQ0 = 1 |
| Cycle N + 2: | DTERM = FFFL1EQ0 = 1 |

During Cycle N−1 the last ZCU character is received and loaded into RCU 350 and RBLN 359. Residue in RBLN 359 is loaded into RCU 350 on Cycle N for comparison on Cycle N+1.

BITSTRINGS

The five bitstring instructions are all similar and execute 9 bits of each string each cycle. Bit alignment of string 1 was described above. The RCU and RCV bytes are masked in ZUM 359 and ZVM 360 by MSK1 and MSK2, respectively also denoted RMASK1 and RMASK2 generated by control logic. All bits not part of the specified string are replaced by the FILL bit. Thus the shorter string is padded to be the same length as the other string.

For the CMPB instruction, the ZUM and ZVM bytes are compared until either an unequality is found or both strings have exhausted.

For CSL, CSR, SZTL, and SZTR the two strings are combined by one of 16 possible functions specified by bits 5-8 in the instruction (a field denoted BOLR). The ZFF network 364 converts the four function bits of the instruction word to ZFF controls (cZFF) as follows:

| Function | BOLR<br>5 6 7 8 | cZFF<br>0 1 2 3 |
|---|---|---|
| MOVE | 0 0 1 1 | 0 0 0 0 |
| AND | 0 0 0 1 | 0 1 0 0 |
| OR | 0 1 1 1 | 0 0 0 1 |
| NAND | 1 1 1 0 | 1 0 1 1 |
| Exclusive OR | 0 1 1 0 | 1 0 0 1 |
| Clear | 0 0 0 0 | 1 1 0 0 |
| Invert | 1 1 0 0 | 1 1 1 1 |

Results from ZFF 364 are gated by MSK2 to pad with zeroes in ZFI 362 in order to test for all zero results to set the ZERO indicator and to combine with rewrite (OP2) in ZFM 361. The results for CSL and CSR are loaded into RWC 357 via ZOC 363. The signal FBS-HOLD will inhibit the first write into RWC 357 if BSC is negative for CSL or BSC is positive for CSR.

| Cycle N − 1: | FEXH2 = 1 |
| Cycle N: | FL2EQO = 1 |
| Cycle N + 1: | DTERM = FFL2EQO = 1 |
| Cycle N + 2: | FLVL2-BSY = 0, FIND-VALID = 1 |

MOVE WITH TRANSLATION MVT

The RCU character is transferred to the CUPS 204 via buffer 365 (ZTRLT), loaded into a 16 deep stack, and used to index a translate table. If this stack becomes full, the CUPS 204 returns the RTRLT-FULL to set FTRL-HOLD which inhibits selecting RCU characters. Both the L1 and L2 quantities are decremented for each RCU character selected. When L1 exhausts, FILL is selected by ZCU 358 to be translated. When L2 exhausts, DTRL-LAST is sent with the last character to the CUPS 204 to signal translation is finished. This signal allows the CUPS 204 to go to its final write sequence and to label the last translated character sent back to the DECCU 211 with DOP-EXH.

For 4 to 6-bit results, the first entry in Stack B 331 is rewrite 1 data. Translated data identified by the DTRL-DATA bit is loaded in Stack B 331. Accompanying the data is the 2-bit character number of the desired character RVA-ET (36-37).

This 9-bit character is selected by ZCV 378 and loaded into RCV 351. It is then moved directly to RWC 357 via ZOC 363 to give the result string. Rewrite 2 if present is read from Stack B 331 after the last translated character has been processed. This instruction opens up the pipeline because of the two way dialog between the CUPS 204 and the DECCU 211.

| Cycle N − 1: | FEXHB, last translated character (CH) → RCV |
| Cycle N: | FFEXHB, RCV → RWC |
| Cycle N + 1: | DTERM = FFFEXHB = 1 |
| Cycle N + 2: | FLVL2-BSY = 0 |

TEST CHARACTER AND TRANSLATE TCT, TCTR

The RCU character is transferred to the CUPS 204 via buffer 365 (ZTRLT). However, there is no result string, no rewrite data, and the L2 quantity is not decremented. DTRL-LAST is sent with the last character to the CUPS 204 when the L1 quantity exhausts. Translated characters are selected and loaded into RCV 351. During the character execution cycles RCV 351 is tested for all zeroes. When a non-zero character is found or all characters have been translated, the instruction terminates. The last RCV character is also loaded into RWC 357, and stored in the result stack along with the tally count of the number of zero characters processed. The tally is incremented by one for each RCV character by cINC-TALLY. A tally run-out indicator (TRO) is set if a non-zero character was not found.

| Cycle N: | FFEXB or DZCVEQO |
| Cycle N + 1: | FFFEXB or FZCVEQO DTERM |
| Cycle N + 2: | FSTR-TALLY |
| Cycle N + 3: | FLVL2-BSY = 0 |

COMPARE CHARACTERS AND TRANSLATE CMPCT

The word compare operation of the CMPCT instruction as described in connection with the description of the two comparison networks of comparator 379 above is performed here. This operation continues while DCMP-ENA is true. If the two strings compare equal, the ZERO and CARRY indicators are set by the compare network 324. If an unequal word compare occurs, DCMP-HOLD is sent to the edit control logic. The following cycle the two different characters are loaded into RCU 350 and RCV 351. Then the characters are selected and sent to the CUPS 204 via buffer 365 to be translated according to the D1 and D2 bits (bits 9 and 10 of the instruction).

| D1 | D2 | Translate |
|---|---|---|
| 0 | 0 | RCU and RCV |
| 0 | 1 | RCU |
| 1 | 0 | RCV |
| 1 | 1 | Neither |

The last character to be translated is marked with DTRL-LAST. This sequence for D1=D2=0 is shown in FIG. 12D.

When the translated data is received, it is loaded in Stack B 331. The characters are selected by ZCV 378 in the same manner as described above for the MVT instruction. If D1=0 the first ZCV character is loaded into RCU. If D2=0, the proper ZCV character is loaded into RCV 351. ZUM and ZVM are then compared, and results are sent to the edit control logic, registered and sent to the controller to set the ZERO and CARRY indicators.

BTD AND DTB CONVERSION

One bit at a time (BTD bit) is obtained from RCU 350 and sent to the DAU 40 for the BTD instruction. Each ZCU character is loaded into the RCU 350 register 9 times with decreasing bit shift counts. When the bit shift count (RBSC or BSC)=1, cINC-UCNT, a control signal which increments the U character control counter, causes the next character to be read. BTD-DTA-TRN indicates the bit transfer mode. BTD-DTA-VLD indicates that data is available in RCU 350 for conversion. The DAU 40 converts one bit at a time. The resulting decimal operand is passed through the DAU adder to set indicators before transfer to RDCR 312.

DTB conversion is accomplished by a numeric load into the DBD-RBTD register. Conversion by ROM's to a binary number then takes place. The DTB conversion process will be described more fully hereinunder. When fully converted, one byte at a time from right to left is sent to edit logic 321 via RBCW0 (0–8) for collection in RWC 357 and then RDCR 312. DTERM is generated by FL2EQO after the last byte has been received.

SCAN MASKED SCM, SCMR

The scan character from string 2 is loaded into RCV 351 on cycle FG9 and held. An inhibit mask given in the instruction word is inverted and switched into MSK1 and MSK2. (RMASK1 and RMASK2 are register copies of MSK1 and MSK2, respectively.) RCU characters are masked in ZUM 359 and exclusive ORed in ZFF 364 with ZVM data. The results are zero detected by zero detector 366 to give a signal which indicates a match was found. For every RCU character examined which did not match the RCV character, the tally count will be incremented by 1 the following cycle. The instruction terminates when either a match is found or L1 exhausts. If no match is found by the time all of OP1 has been processed, the TRO indicator will be set. RTALLY 346 of alignment network 323 is stored in the result stack RDRS 314.

| N − 1: | DZFIEQO = 0 |
| N: | DZFIEQO = 1, cINC-TALLY |
| N + 1: | DTERM = FZFIEQO = 1 |
| N + 2: | FSTR-TALLY, FIND-VALID |
| N + 3: | FLVL2-BSY = 0 |

SCAN DOUBLE SCD, SCDR

The first scan character from string 2 (right most for the SCDR instruction) is loaded into RCV 351 on cycle FG9 and held. V character control counter RVCNT is incremented so that the second scan character loaded into RCU 350 is compared (exclusive ORed) in ZFF 364 and ZFI 362 while the second OP1 character at ZCU is compared in CMP 373 with ZCV. If no match occurs the tally count is incremented by 1 the following cycle and character 2 of OP1 is moved to RCU 350. A double comparison is again made until either a match is found or the L1 quantity exhausts. The tally is stored when the instruction terminates in the same manner as the SCM instruction. The TRO indicator is set if L1-1 characters are processed without a match.

EDITS MVE, MVNE, MVNEX

Execution of the three edit instructions is very similar and will be discussed together. The execution of the edit instructions of the preferred embodiment of the present invention is implemented utilizing micro operations. The sequence of micro steps to be executed are contained in OP2 of the instruction word. Some of the micro operators require special characters for insertion in the string of characters being manipulated. The special characters are contained in an edit insertion table (RBTL) 367. The second operand descriptor for micro operations points to a string of 9 bit characters which specify the micro operation (MOP) to be performed during an edited move. Each of the 9 bit characters defines a micro operation having a predefined format which includes a micro operation field and an information field (IF). The edit insertion table 367 comprises a register of eight 9 bit characters to hold insertion information. At the start of each edit instruction the DECCU 211 initializes the edit insertion table 367 via a ZIK switch 374 wherein each symbol contained in RBTL 367 refers to a corresponding standard ASCII, EBCDIC, or BCD character. One or all of the table entries may be changed by a "load table entry" (LTE) or a "change table" (CHT) micro operation to provide different insertion characters. Seventeen micro operations are defined in the preferred embodiment of the present invention, the function and definition of each micro operation being more fully described in the Honeywell Software document, entitled "DPS 8 Assembly Instructions," referenced above and incorporated by reference herein.

The source string OP1 is moved to the result string OP3 as directed by one or more micro operators of OP2. The first OP1 character is loaded into RCU 350 and the first MOP into a control register RMOP. If there is a leading separate sign, the contents of RCU 350 are discarded and the first digit is loaded into RCU 350. Meanwhile the MOP in RMOP is being decoded, and the execution count is loaded into a control counter RIF. An edit table control counter RTCC is initialized to 1 for use by a CHT MOP. The execute MOP F/F FEXMOP is set on, and the first MOP is now ready to be executed. This sequence is shown in FIG. 12E.

A character can be written into the result register RWC 357 from the sources:

1. From the source string RCU via ZOC 363 position 1 or ZOC 363 position 2 with ASCII zone bits in the case of MVNE with 9-bit results.
2. From one of eight characters of the edit insertion table 367 via ZOC 363 positions 4 and 5.
3. From a character following a MOP in RCV 351 via ZOC 363 position 2.

Six edit control flags are utilized within edit control logic during execution of the edit instructions. They are defined as follows:

FZ-All OP1 characters (least 4 bits) moved so far are zeros.

FBZ-Blank-when-zero has been specified by an "End Floating Suppression" (ENF) or "Set End Suppression" (SES) micro operation.

FES-End suppression of leading zeros.

FSD-A sign has been detected by a "Move and Set Sign" (MSES) micro-operation or the MVNE instruction.

FSN-The sign OP1 is negative as determined from the MSES micro operation or the sign/exp logic 322 for MVNE.

FEXMOP-This is a MOP execute cycle as opposed to a MOP decode cycle.

The edit insertion table 367 is initialized to ASCII for MVE and MVNE. For MVNEX the edit insertion table is initialized as follows depending on bits 0 and 1 of the instruction word:

00—initialize to EBCDIC
01—initialize to BCD
10—initialize to ASCII

A dual read of the edit insertion table 367 allows the choice between two table entries ZTBLA and ZTBLB via the respective ZTBLA switch 368 and ZTBLB switch 369, to be made late in a cycle based on conditions other than MOP code. These conditions are usually the FES flag, an IF field (RMOP5-8) equals zero, and an RCU OP1 character of zero.

A "Move and OR Sign" (MORS) micro operation ORes the sign with the source character in ZOR 370 and writes the results in RWC 357 via ZOC 363 Position 3. The MSES MOP moves the RCU character to RWC 357 but also does two comparative AND examinations in COMPAND+ 371 and COMPAND− 372, in parallel, to determine an overpunched sign.

If the result string is completed, indicated by control signal FL3EQO and both the FZ and FBZ flags are true, an FBLANK flag is set. This causes the edit instruction to start over. MOP's are not executed, but the blank character from ZTBLA 368 is written into the result stack RDRS 314 over any previous results from this same instruction.

Rewrite data is also held in Stack B 331 with the MOP strings for 4 and 6-bit result strings. Rewrite 1 is located after the first double word of MOP's. Rewrite 2 (if any) is located after the last double word of MOP's. After the MOP which completes the result string is finished, a FDUMP-MOPS flag is set. This will dump the remaining MOP's (if any) a word at a time until the Rewrite 2 data can be read.

RWC REGISTER AND SWITCH

The RWC 357 register and input switch collects a half word of 4, 6, or 9-bit characters from ZOC 363. When RWC 357 is full or the last character has been inserted, the contents are loaded into RDCR 312. Here they are collected to form a double word for the result stack RDRS 314.

The whole 18 bit RWC register 357 is strobed whenever control signal c$RWC is true. Character positions which are not being changed on a given cycle are loaded with RWC 357 reinserted through the input switch ZRWC 357. Switch controls are enabled for 4, 6, and 9-bit characters for each character position number as follows:

| Type | cZRWC | | | | | | | |
|---|---|---|---|---|---|---|---|---|
|  | c0 | c1 | c2 | c3 | c4 | c5 | c6 | c7 |
| 9-bit | 0 | 0 | 0 | 0 | 1 | 1 | 1 | 1 |
| 6-bit |  | 0 |  | 1 |  | 1 |  | 2 |
| 4-bit | 0 |  | 1 |  | 2 |  | 3 |  |

For example, to insert a 6-bit ZOC character into position #1 cZRWC controls 3 and 5 must be enabled.

Figure 13:
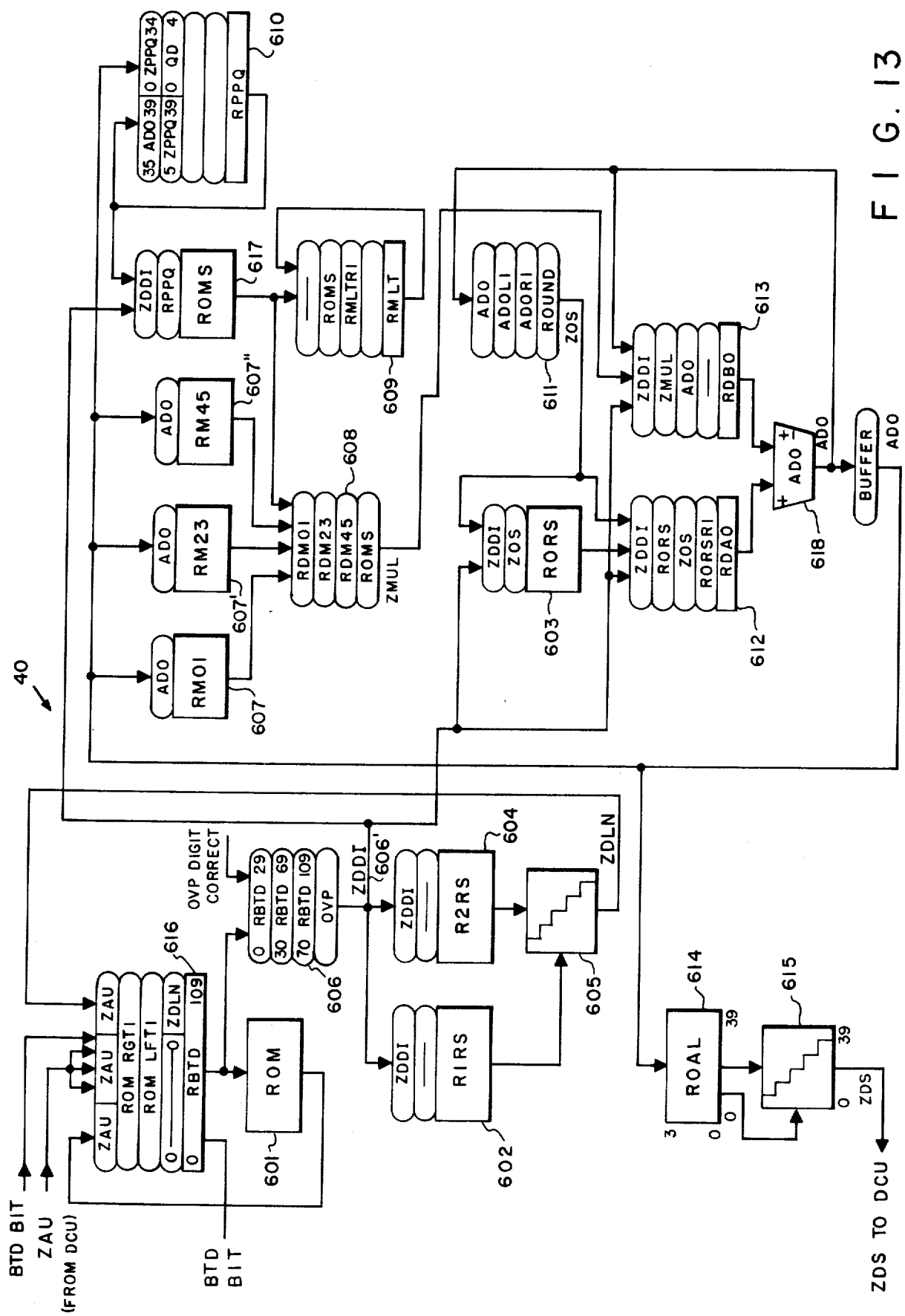
FIG. 13 shows a functional logic diagram of the decimal arithmetic unit of the preferred embodiment of the present invention.

Referring to FIG. 13, there is shown a functional logic diagram of the DAU 40. The DAU 40 data paths have been optimized to provide maximum speed for the various class instructions utilizing scaled operands. The operand fetching sequence implemented in the CUPS 204 logic performs a fetch of Operand 1 (OP1), most significant digits first, followed by a fetch of Operand 2 (OP2) least significant digits first. This sequence allows eight digits of result generation each cycle time as operand 2 is being fetched. As OP1 is being fetched, it is loaded into the DAU operand queues ROMS 617 or RORS 603 and the DAU realignment stack 602 (R1RS). As OP2 is being fetched, it is loaded into the DAU operand queues ROMS 617 or RORS 603 and the DAU realignment stack 604 (R2RS). Numeric operands can be of any length between 1 and 63 digits, 4 bit or 9 bit digit size, scaled or floating point. Data is always handled as 4 bit digits in the DAU 40.

Input operands are transferred to the DAU 40 from the DCU 30 in the form of packed 4 bit digits. Packing is done as each double word is received by the DCU 30 in the case of 9 bit data. If both input operands are defined as scaled, the operand with the algebracially larger scale factor will be aligned left upon transfer to the DAU 40. The other operand will be right digit justified on transfer to the DAU. In all cases a maximum of 9 words need to be transferred for the largest operand length or alignment amount.

A first class of instructions (ADD/SUBT/CMPN) requires scale factor/exponent alignment prior to the initiation of the Add/Subtract sequence. Operand alignment is performed by the Decimal Character Unit (DCU) 30 in the case of scaled operands since the scale factors are known prior to reception of the data. Operand alignment required due to floating point operands is performed by the DAU 40 since the exponents are fetched along with the data. The alignment is accomplished by implementing a left shift of the operand with the algebraically larger exponent/scale factor. Since it is possible to a left shift of up to 255 digits (maximum exponent difference), storage area is conserved by not transferring zeros for any least significant all zeros words required in a left shifted aligned operand. Therefore, it is possible to store any size aligned operand in a nine word (8 digits/word) stack while accounting for trailing zeros words by means of a calculated negative word offset pointer. Since scale factors are known prior to receipton of scaled operands, the operand alignment is performed by the DCU 30 as the operand is brought in. In the case of one or more floating point operands, the DAU 40 realigns the proper operand, either OP1 or OP2, after they are both loaded by the DCU 30 into the realignment stack 602/604. The DAU 40 has logic (not shown) that compares the OP1 and OP2 exponents, calculates the shift value and shifts the operand in alignment network 605 the proper amount as it is being read out of either R1RS 602 or R2RS 604. This shift value calculation may be performed in a manner described in U.S. Pat. No. 4,268,909, entitled Numeric Data Fetch-Alignment of Data Including Scale Factor Difference, by Kindell et al, and assigned to the same assignee as the present application. As the realigned operand is brought in, the add/subtract sequence produces the result at the rate of one word per cycle.

A second class of instructions (MVN/BTD) does not require input operand alignment since only one operand is provided. The DAU 40 instead of the DCU 30 performs these instructions to take advantage of the DAU 40 output alignment capabilities, as will be described further hereinunder.

As operand 1 is loaded from the DCU 30, it is loaded into a register RBTD 616 and examined for illegal digit values (>9). Operand 1 is then distributed through a ZDDI selector 606 onto a ZDDI bus 606' for distribution to the realignment stacks 602, 604, and for ADD-/SUBT/MVN/CMPN operations, operand 1 is also transferred to ROMS 617. For a MULT/DIV operation, operand 1 is loaded into RORS 603 where multiple generation can proceed during reception of operand 2.

Operand 2 is loaded from the DCU 30 into RBTD 616 and examined for illegal digits (>9). It is then distributed through ZDDI selector 606 onto the ZDDI bus 606' for distribution to the realignment stacks 602, 604, and in the case of the ADD/SUBT/CMPN/DIV operation, operand 2 is also transferred to RORS 603. For MULT, operand 2 is transferred to ROMS 617 and treated as the multiplier. Operand 2 is the dividend for the DIV operation. ZDDI Selector 606 also operates as the merge path for the corrected overpunch digit on extended instructions. This is the numeric value assigned to the digit after the sign information has been extracted.

During the DTB instruction, RBTD 616, and ROM 601 convert a decimal integer bit-by-bit into a signed binary number. During the BTD instruction RBTD 616, ROM 601 and ZDDI selector 606 are used to convert a signed binary number into a signed decimal integer. The rest of the DAU 40 in this case recomplements the decimal number if it were negative.

If either or both input operands were floating point, then the operand with the algebracially larger exponent is obtained by the DAU 40. The target operand is read out of realignment stacks 602, 604, from least significant to most significant, digit shifted by alignment network ZDLN 605 and inserted into the operand data path through register RBTD 616.

The realignment stacks 602, 604, and alignment network ZDLN 605 are also utilized as an operand source for MULT if an operand swap is to be done, and an operand source during DIV to perform most significant non-zero digit alignment prior to entering the divide inner loop.

Stacks RM01, RM23, & RM45 (607, 607', 607", respectively) hold the multiples of the multiplicant (operand 1) during the multiply operation, the multiples of the divisor (operand 1) during the divide operation, and the intermediate final result of all instructions for additional output processing if necessary. ROMS 617 holds operand 1 for the ADD/SUBT/MVN/CMPN operation, the mutiplier (operand 2) and part of the partial product during the multiply operation, and the accumulating quotient digits during the divide operation.

Selector ZMUL 608 transfers operand 1 to an adder register RDBO 613 during ADD-/SUBT/MVN/CMPN operations, the proper multiple from RM01, RM23, RM45 607 during the multiply and divide inner loops, and provides a path for the final results of the multiply and divide operations to an output data path via a decimal adder 618 through register RDBO 613.

A register RPPQ 610 accumulates quotient digits one at a time during divide operation to be temporarily stored a word at a time into ROMS 617. During the multiply operation, RPPQ 610 accumulates the partial product one digit at a time until it can be stored one word at a time into ROMS 617. To perform this function, the register RPPQ 610 is effectively left shifted one digit at a time for the divide operation and right shifted one digit at a time for the multiply operation.

A register RMLT 609 is used during the multiply operation as an examination point for the multiplier. The multiplier is loaded a word at a time from ROMS 617 into RMLT 609 where the least significant digit is used to select the proper multiple from RM01, RM23, or RM45 607 via ZMVL 608. RMLT 609 is shifted right one digit at a time as the multiplier is processed.

Stack RORS 603 contains operand 2 for the ADD-/SUBT/CMPN operation. RORS 603 also contains the accumulating partial product in a multiply operation and remainder in a divide operation. Registers RDAO 612 and RDBO 613 contain the operands that are being added/subtracted by the decimal adder ADO 618. The contents of RDBO 613 is subtracted from the contents of RDAO 612 during a subtract operation.

During an ADD/SUBT/MVN/CMPN operation, one or the other operand can bypass its associated data stack as it's being loaded. For example, during an ADD operation, if there are no output holds the result can be generated immediately. In this case operand 2 will not only load into RORS 603 as it is received, but will also load directly into RDAO 612 at the same time. This feature allows the input stream to continue processing even though the output stream has a hold. A similar bypass path exists for register RDBO 613 since a similar situation can occur with operand 1 if the input operands were floating point and operand 1 was being realigned.

A switch ZOS 611 is utilized during a MULTIPLY/-DIVIDE operation to implement shifting algorithms. During the divide operation (and length is >7 digits) the result of each ADD/SUBTRACT cycle is left shifted one digit position prior to storage into RORS 603, and right shifted after being read out of RORS 603 (via register RDAO 612) for the next ADD/SUBTRACT cycle, thereby eliminating a special right digit shift of the reduced dividend as each quotient digit is produced. During a multiply operation, ZOS switch 611 provides a right digit shift into RORS 603 for accumulating the partial product.

The intermediate final result from the decimal adder 618 is transferred to the multiple storage stacks RM01, RM23 and RM45 607 right digit justified and also transferred to the output realignment stack ROAL 614 if no further output processing is required. If further output processing is required (recomplementation of result, rounding of result, floating point result or sign recomplement), each reprocess that is required (any sequence of the above in the indicated order) will take its source from RM01, RM23, and RM45 607. The final result is aligned to the descriptor defined destination string using output alignment stack 614 and digit alignment network 615. The packed aligned result is transferred to the result stack in the DCU 30 via bus ZDS.

Figure 15:
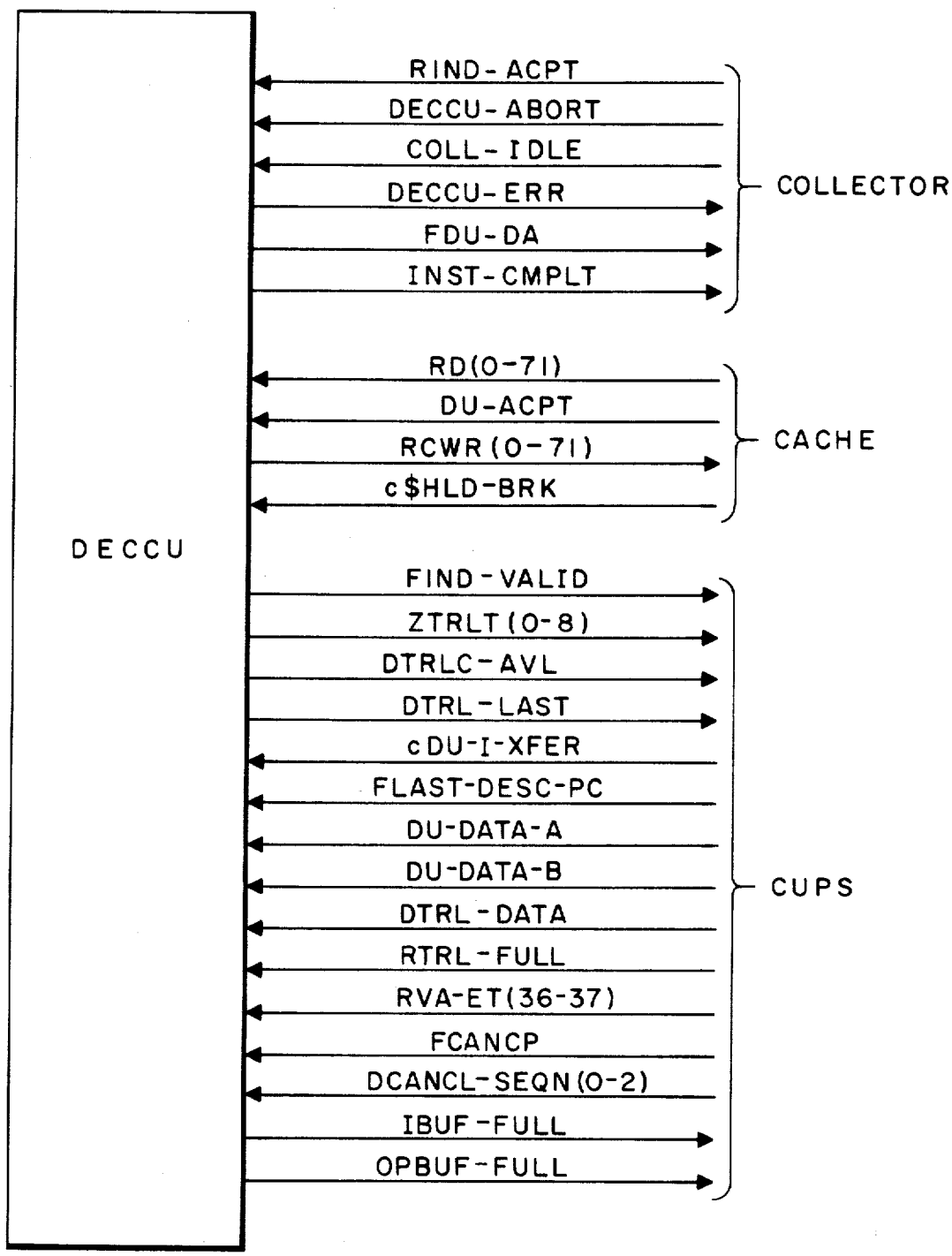
FIG. 15 shows signals between the DECCU and the other subsystems of the data processing system.

Referring to FIGS. 14 and 15, there is shown the control signals between the DECCU 211 and a DECCU controller 215, and the DECCU 211 and the other subsystems of the DPS 10. The control signals and their functions are listed below in Table 6. The control signals not included in the figures are internal to the DECCU controller 215 and hence are not transferred to the DECCU 211.

TABLE 6

| | |
|---|---|
| COLL-IDLE | A signal from Collector during fault processing causing DECCU to adjust tally. |

TABLE 6-continued

| | |
|---|---|
| DECCU-ERR | Hardware error in DECCU signal to Collector. |
| FDU-DA | Result data available to Collector. |
| INST-CMPLT | Instruction complete signal to Collector. |
| FIND-VALID | Indicators for CUPS are now valid. |
| ZTRLT(0-8) | Character to be translated sent to CUPS. |
| DTRLC-AVL | Translate character is available to the CUPS. |
| DTRL-LAST | Last character to be translated is now begin sent to CUPS. |
| DCU-SEQN(0-2) | Sequence number of instruction being terminated. |
| IBUF-FULL | DECCU instruction buffer is full. |
| OPBUF-FULL | DECCU operand stacks A or B have more than 10 entries waiting to be executed. |
| cEIS-DONE | CUPS is finishing EIS instruction. |
| FWF-POA-I | Wait for FPOA-I generated by cEIS-DONE. |
| DOP-EXH | Accompanies last operand data for DECCU operand stack. It prevents holding DECCU execution for lack of more operand data. |
| FCMP-HOLD | A F/F set when a character comparison failed the previous cycle. |
| FOUT-HOLD | A F/F set when DOUT-HOLD was generated the previous cycle because rewrite data was missing or the result stack was full. |
| CSEQ-HOLD | A hold signal which interrupts DCU start sequence when it is still busy executing the previous instruction. |
| DTERM | This signal terminates character operations and CMPC when the instruction is finished. |
| DLDWRT2 | Load rewrite register to merge with last 4 or 6-bit result. |
| FGALN1 | Align operand 1 next cycle. |
| FGALN2 | Align operand 2 next cycle. |
| FALN1 | Align operand 1 in alignment network. |
| FALN2 | Align numeric operand 2 in alignment network. |
| FFST-STR | Store the first double word of results into RDRS result stack. |
| FLST-STR | Store the last double word of results into the result stack. |
| DALN-WRD | An aligned word is available from ZAS. Used to decrement mask pointers until exhaust. |
| ZAU-DA | Load aligned numeric word from ZAU into RBTD. |
| FDAU-DA | Load ZDS data from the DAU into RDCR. |
| FDU-DA | Result data is available to the Collector. |
| DATA-ACPT | The combination of CACHE-REQ and DU-ACPT used to increment the result stack read pointer. |
| FIND-VALID | DECCU indicators are valid and sent to the CUPS for transfers. It is on for one cycle. |
| DOUT-HOLD | An output hold signal generated because rewrite data is missing or the result stack is full. |
| FFL2EQO | String 2 exhaust signal. This F/F is set by FL2EQO. |
| FSTR-TALLY | This signal is generated at the completion of a scan or TCT instruction to store the tally count into RDCR and hence RDRS. |
| FZFIEQO | Masked output of ZFI logic network is all zero. This F/F is set by DZFIEQO. |
| cINC-UCNT | Control signal to increment the RUCNT character counter. |
| cINC-VCNT | Control signal to increment the RVCNT character counter. |
| cINC-WCNT | Control signal to increment the RWCNT character counter. |
| FEXH1 | Length 1 exhausts during this execution cycle. |
| FEXH2 | Length 2 exhausts during this execution cycle. |
| FL1EQO | Length 1 has exhausted. This F/F is set by FEXH1. |
| FFL1EQO | Length 1 has exhausted. This F/F is set by FL1EQO. |
| FFFL1EQO | Length 1 has exhausted. This F/F is set by FFL1EQO. |
| FL2EQO | Length 2 has exhausted. This F/F is set by FEXH2. |
| FL3EQO | Length 3 has exhausted. |
| DZUMEQV | The masked character outputs of ZUM and ZVM compare equal. |
| DZCVEQO | The character being read from RCV is all zero. |
| DZFIEQO | The masked output of the ZFF logic network is all zero. |
| cINC-TALLY | Control signal to increment the tally counter RTALLY. |
| DZCUEQV | The selected character outputs of ZCU and ZCV compare equal. |
| FZCVEQO | The RCV character executed was all zero. This F/F is set by DZCVEQO. |
| FFEXHB | This is the last RCV character for the translated string has exhausted. |
| FFFEXHB | Last RCV has been executed. This F/F is set by FFEXB. |
| C$HLD-BRK | Hold from Cache inhibits acceptance of data or instructions by the DECCU. |
| cDU-I-XFER | Instruction/descriptor data is being transferred to DECCU. |
| FLAST-DESC-PC | Last descriptor for this instruction is being transferred. |
| DCU-DA | Operand data is available for DECCU. |
| DU-DATA-A | Load operand data in stack A. |
| DU-DATA-B | Load operand data in stack B. |
| DTRL-DATA | Operand data is from translate table. |
| RTRL-FULL | CUPS translate register stack is full at present. |
| DL2 < 256 | Length of OP2 in CUPS is less than 256. |
| FCANCP | Cancel the instruction in the pipeline. |
| DCACEL-SEQN(0-2) | The sequence number of the instruction to be cancelled in the DECCU. |
| RVA-ET(36-37) | Byte position of translated character in word sent to DECCU. |
| DU-ACPT | DECCU result data is accepted by the Cache. |
| CACHE-REQ | A store request to cache for DECCU results made by Collector. |
| DECCU-ABORT | Abort the DECCU by the Collector because of a fault or error. |
| RIND-ACPT | Indicator accept signal from Collector for instructions which store no results. |
| IBUF-RDY | Instruction data is available in RDIB. This increments a "G cycle" counter whose states are defined. |
| C$RDCA-SA- | This control loads the next available write address for the RDCA and RDCB operand stacks into the start address register. |
| FLD-MASKS | This starts the mask generation sequence and loads the left and right pointers into RMP1 and RMP2 control registers. |
| FIRST-MASK | The first masks for OP1 and OP2 are loaded into RM1L, RM1R, RM2L, RM2R control registers. |
| FLVL1-BSY | This level 1 busy signal is on four or more cycles while execution code and descriptor data is being read |

TABLE 6-continued

| | |
|---|---|
| FLVL2-BSY | from RDIB to various control logic. This level 2 busy signal is on for the full time alphanumeric instructions are executed or for the input data alignment cycles for numeric instructions. |
| FOUT-BYS | This level 3 busy signal is used for numeric instruction. It is set when the second operand has been aligned and sent to the DAU and reset when the last result word has been received from the DAU. |
| FANLD1 | Alphanumeric operand 1 load gate into RALN. |
| FANLD2 | Alphanumeric operand 2 load gate into RCMP. |
| FNLD1 | Numeric operand 1 load into RALN. |
| FNLD2 | Numeric operand 2 load into RALN. |
| FLDWRT1 | Load rewrite register to merge with first 4 or 6-bit result. |

Figure 16:
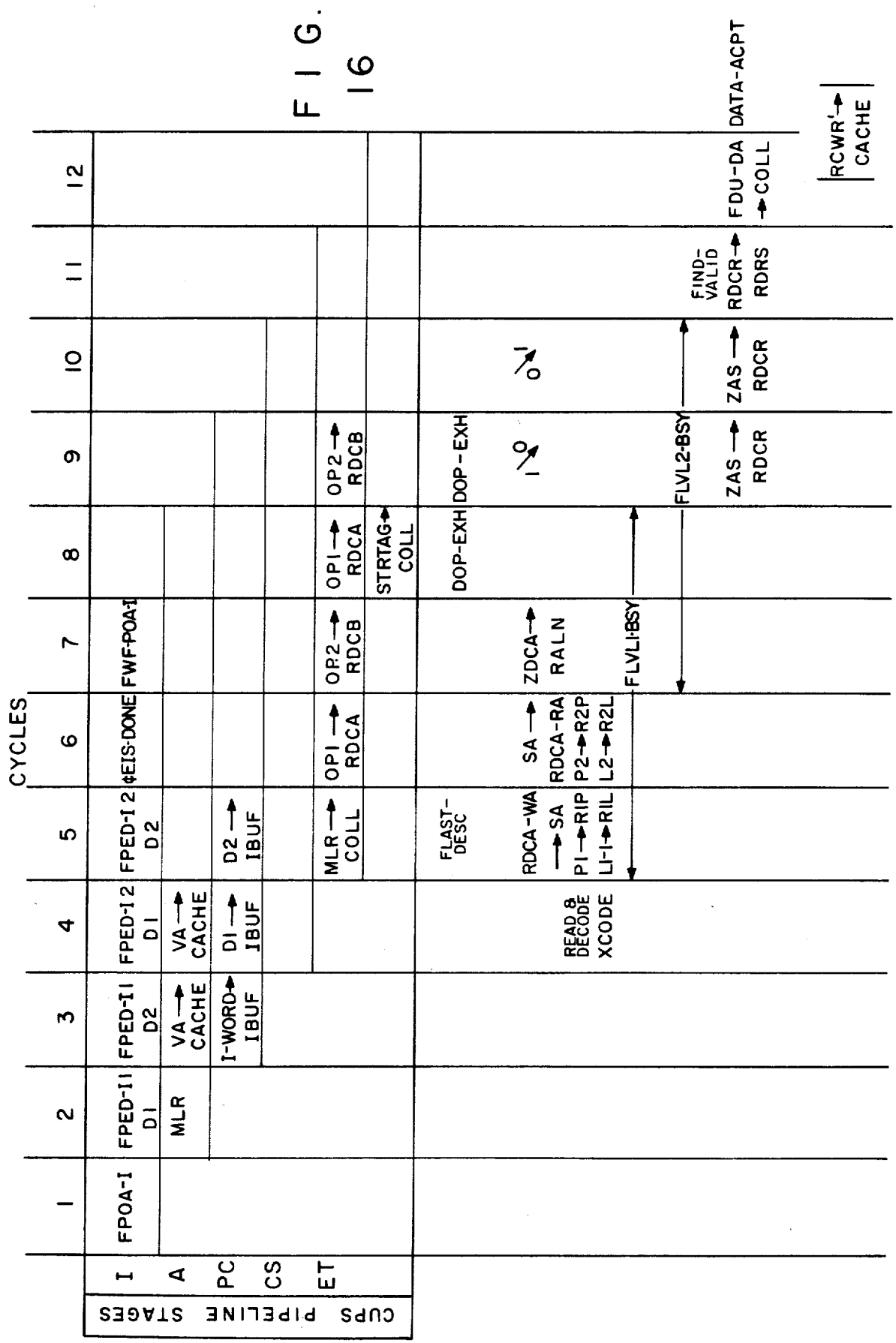
FIG. 16 shows a generalized control sequence for the execution of a word type instruction.

Referring to FIG. 16, there is shown a generalized control sequence for the execution of a word-type instruction by the DECCU 211, and in particular there is shown the control sequence for the MLR instruction. As discussed above, each stage of the CUPS 204 peforms a predefined function in overall execution of the instruction. The I-stage 205 prepares the operand address, FPOA-I (cycle 1). In cycles 2 and 3, the I-stage 205 prepares the first descriptor address and the second descriptor address (D1 and D2, respectively) (FPED-I1 D1, FPED-I1 D2). For instructions which require additional descriptors, the address preparation is performed in subsequent cycles such as cycles 4 and cycles 5. (Note that control signals may utilize a ¢ or a c, both symbols intended to be identical.)

In the I stage 206 of the CUPS 204, the operation is determined during cycle 1; in this example the operation is determined to be a MLR instruction. During cycles 2 and 3, address modifications for the first and second operands, respectively, are performed. During cycles 3 and 4, the virtual address is transmitted to cache 201 to do a fetch of the first operand and the second operand, respectively.

In the PC stage 207 of the CUPS 204 pipeline, during cycle 3 the instruction word (I-word) is transmitted to the I-BUF 333. During cycles 4 and 5, respectively, the descriptor words D1 and D2 are transmitted to I-BUF 333.

In the ET stage 209 of the CUPS pipeline 204, during cycle 5 the OP-code (MLR) is sent to the collector 213. Operand 1 (OP1) is sent to RDCA 330 during cycle 6 and operand 2 (OP2) is sent to RDCB 331 during cycle 7. If additional operands are required in the execution of the instruction, the operands are transmitted to the respective input registers on subsequent cycles. During cycle 8 a store tag is transmitted to the collector. The last descriptor received from CUPS 204 is accompanied by a control signal indicating that the last descriptor has been transmitted (FLAST-DESC). Likewise, when the last operand has been received there is an associated control signal indicating an operand exhausted associated with operand 1 (DOP-EXH).

During cycle 4 the DCU 30 of DECCU 211 reads and decodes the execution code out of I-BUFF 333 (Read and Decode XCODE). During cycle 5, P1, the word character pointer is moved into R1P and L1-1 is moved into R1L (R1P and R1L are level 1 temporary registers included in control logic of the DCU 30). Likewise pointer P2 and length L2-1 are moved into level 1 temporary registers. The character points, P1 and P2, and lengths L1-1 and L2-1 are contained in the descriptor words and are described above in conjunction with FIG. 8. (The operation of RDCA-WA into SA, and SA into RDCA-RA is the function of setting up the read address and write address pointers of the operand buffers). At the start of cycle 5, when the instruction and descriptors are read out of I-BUF 333, a control signal (FLVL1-BSY) indicates that level 1 is busy. While level 1 is busy, another execution code cannot be read out of I-BUF 333 until the level 1 control signal is returned to a state indicating not busy. Data cannot be moved from level 1 to level 2 (or the first stage to the second stage of DCU 30) after cycle 6 unless level 2 is indicated as not busy. A control signal FLVL2-BSY is set indicating level 2 is busy. The above control sequence is essentially common to all instructions. The remainder of FIG. 16 will be described in further detail below in association with a more detailed control sequence diagram of the MLR instruction.

Figure 17:
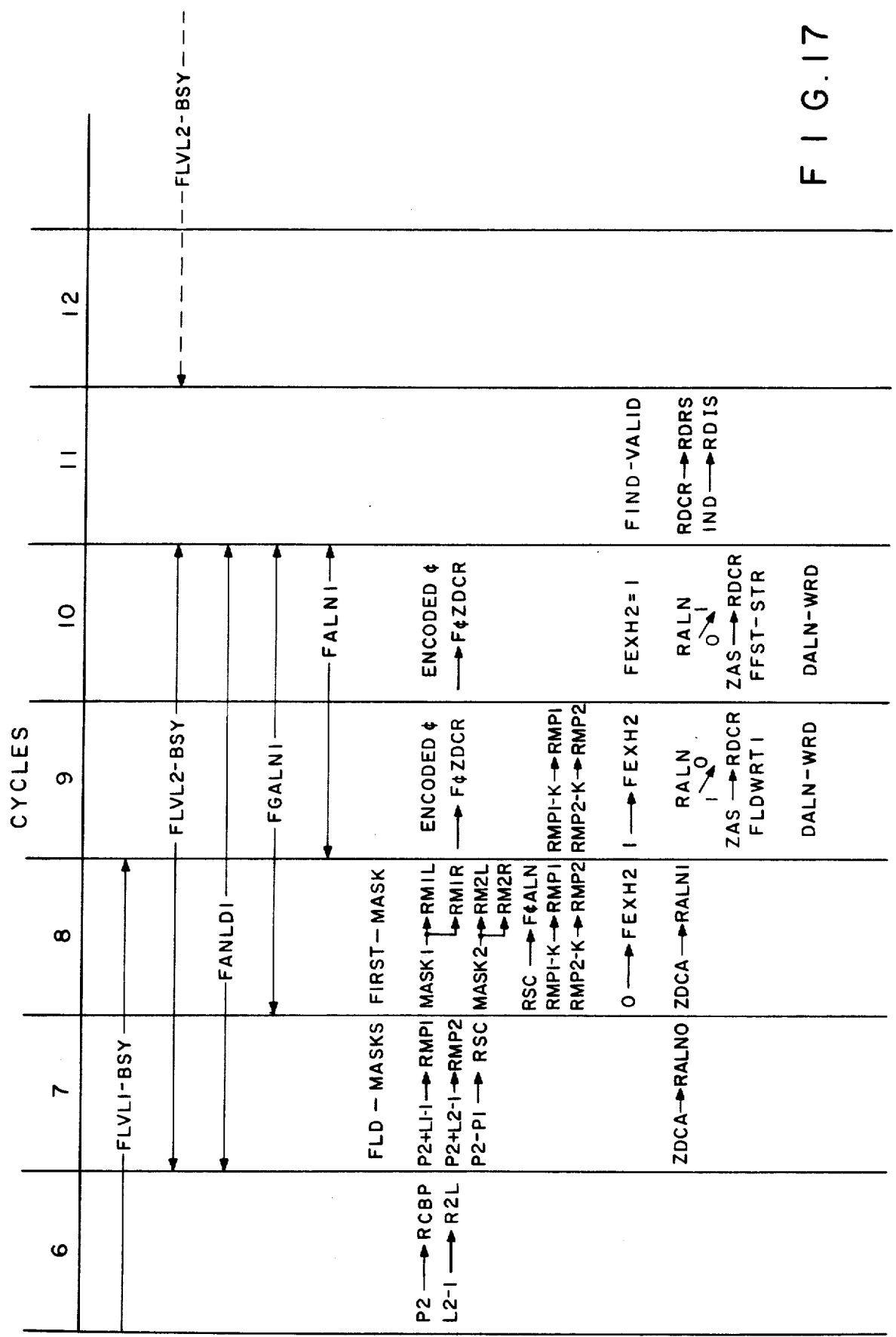
FIG. 17 shows a detailed control sequence for a move left to right instruction.
Figure 18:
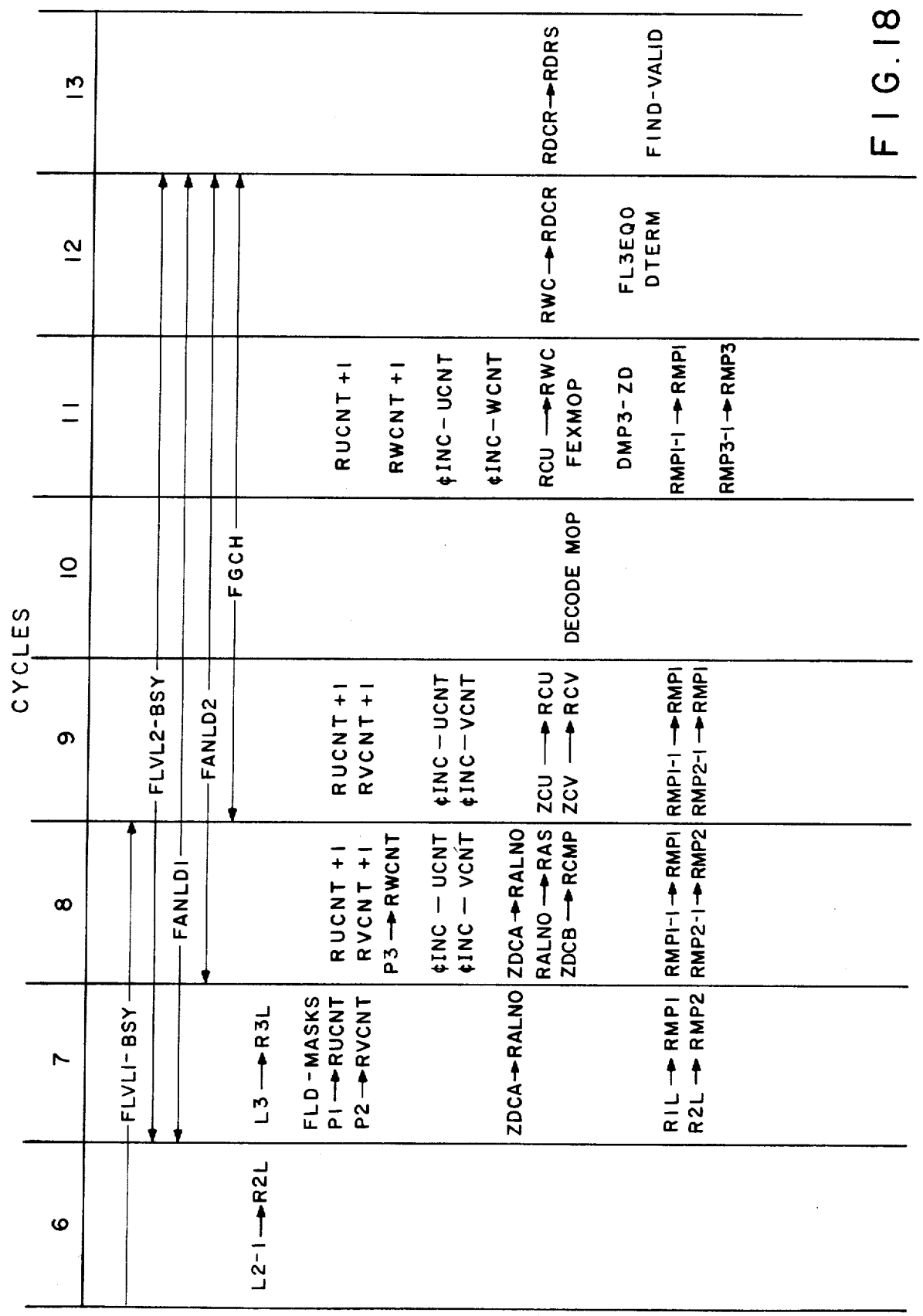
FIG. 18 shows a detailed control sequence for a move and edit instruction.

Referring to FIG. 17, there is shown a detailed control sequence for the MLR instruction. The first operand is transferred from input stack RDCA 330 (via the ZDCA data switch 334) to alignment register ∅ 341 during cycle 7 (ZDCA to RALN∅). Likewise, during cycle 8, the second operand is transferred from input stack RDCA 33∅ to alignment register 1 341 during cycle 8 (ZDCA to RALN1). During cycle 7, the shift count is generated and transferred to the shift register RSC (P2-P1 into RSC), and during cycles 7 and 8 various masks are generated. The first shift operation occurs during cycle 9 (RALN 1/∅, the 1 indicating register 1 of alignment register RALN 341 is connected to the A input of shifter 342 or 343 and register ∅ is connected to the B input of shifter 342 or 343), and the results ZAS are stored in one half of the two-word register RDCR 312. The next shift cycle occurs during cycle 10 (RALN ∅/1, wherein register ∅ of alignment register (RALN) 341 is connected to the A inputs of shifter 342 or 343 and the register 1 is connected to the B inputs of shifter 342 or 343). The results of the second alignment operation are sent to a second half of register RDCR 312 during cycle 10. During cycle 11, the two halves of the resultant shifted word are loaded into the result stack RDRS 314, and likewise the indicator results are stored in the indicator registers RDIS 316. When the last aligned data is loaded into register RDCR 312, level 2 busy indicator is reset (FLVL2-BSY is set to a ∅ at the end of cycle 10, and a flag is set denoting the indicators generated as a result of the operation are valid (FIND-VALID in cycle 11). Although the example only shows two operand words being aligned it is to be understood that more operands may be aligned by continuing the connecting sequence from the alignment register to the shifters in subsequent cycles which is more fully described by related applications number 1 and 2, and incorporated by reference herein. After the level 2 busy indicator is reset at the end of cycle 10, one cycle time is allowed for hardware reinitialization and settling. Level 2 operation may continue after the one cycle pause as denoted by the dotted line (FLVL2-BSY). FIGS. 18 and 19 show a detailed control sequence for the move and edit (MVE) instruction and the two descriptor add (AD2D) instruction but will not be described further herein. The control sequence for the MVE instruction is typical for a three descriptor character type operation and the AD2D control sequence is typical for a two descriptor numeric operation.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:
   (a) first stage means, operatively connected to said central unit and to said cache unit, for temporarily storing input data, said input data including operation commands being received from said central unit defining said decimal type instructions, and said input operand data being received from said cache unit; and wherein said first stage means includes:
      (i) first input buffer means for temporarily storing at least one operation command;
      (ii) second input buffer means for temporarily storing input operand data associated with said temporarily stored operation command; and
      (iii) switch means, operatively connected to said second input buffer means, for distributing said temporarily stored input operand data to a second stage means;
   (b) second stage means, operatively connected to said first stage means, for executing a first predetermined group of said decimal type instructions;
   (c) third stage means, operatively coupled to said second stage means, for executing a second predetermined group of said decimal type instructions, said second predetermined group including arithmetic type instructions; and
   (d) fourth stage means, operatively connected to said second stage means and to said third stage means, for temporarily storing output data resulting from the execution of said operation commands.

2. A pipelined execution unit, according to claim 1, wherein said second input buffer means comprises:
   (a) a first and second operand input stack, each operand input stack having a terminal adapted to receive said input operand data, each operand input stack having an output terminal adapted to transmit said input operand data, and each output terminal coupled to said switch means; and
   (b) a third operand input stack, operatively connected to said fourth stage means, for temporarily storing intermediate resultant operand data, wherein said intermediate resultant operand data is to be utilized as operand data for an operation command temporarily stored in said first input buffer means.

3. A pipelined execution unit, according to claim 2, wherein said second stage means comprises:
   (a) first network means, having an input terminal adapted to receive said input operand data, the input terminal of said first network means operatively connected to said switch means, for aligning said input operand data in a predetermined format, and further having an output terminal adapted to transmit the aligned input operand data, the output terminal of said first network means operatively connected to said third stage means and to said fourth stage means;
   (b) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters; and
   (c) third network means having an input terminal adapted to receive a character string, the input terminal of said third network means operatively connected to the output terminal of said second network means, for performing edit operations on said character string, and further having an output terminal adapted to transmit an edited output string, the output terminal operatively connected to said fourth stage means.

4. A pipelined execution unit, according to claim 3, wherein said first network means comprises:
   (a) first switch means, operatively connected to the input terminal of said first network means, for selecting the input operand data;
   (b) first register means, operatively connected to said first switch means, for storing the selected input operand data;
   (c) first shift network means, operatively connected to said first register means, for performing a nine-to-four shift of the input operand data;
   (d) second shift network means, operatively connected to said first register means, for performing a six-to-six shift of the input operand data, the input operand data directed to one of said first or second shift network means; and
   (e) second switch means, operatively connected to said first and second shift network means, for directing the shifted input operand data to the output terminal of said first network means.

5. A pipelined execution unit, according to claim 4, wherein said second network means comprises:

(a) first compare switch means, operatively connected to the first input terminal of said second network means to receive said input operand data, for inserting a fill character in said input operand data;

(b) a second compare switch means, operatively connected to the second input terminal of said second network means to receive said aligned input operand data, for inserting a fill character in said aligned input operand data;

(c) a first compare register means, operatively connected to said first compare switch means, for holding said filled input operand data;

(d) a second compare register means, operatively connected to said second compare switch means, for holding said filled aligned input operand data;

(e) first compare means, operatively connected to said first and second compare register means, for comparing said filled input operand data to said filled aligned input operand data to generate said zero indicator signal and said carry indicator signal; and (f) third compare switch means, operatively connected to said first and second compare register means, for transmitting character data to the output terminal of said second network means.

6. A pipelined execution unit, according to claim 5, wherein said third network means comprises:

(a) first edit register means, operatively connected to said second network means, for holding a first character of said filled input operand data;

(b) second edit register means, operatively connected to said second network means, for holding a first character of said filled aligned input operand data;

(c) edit logic means, operatively connected to said first and second edit register means, for performing an edit operation on respective first characters of said filled input operand data and said filled aligned input operand data; and (a) third edit register means, operatively connected to said edit logic means, for temporarily storing edited characters prior to transmitting said edited characters to the output terminal of said third network means.

7. A pipelined execution unit, according to claim 6, wherein said second stage means further comprises:

fourth network means, operatively connected to said second input buffer, for extracting the sign character and exponent quantity associated with said input operand data, and further having an output terminal adapted to transmit said sign character and exponent quantity.

8. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:

(a) first stage means, operatively connected to said central unit and to said cache unit, for temporarily storing input data, said input data including operation commands being received from said central unit defining said decimal type instructions, and said input operand data being received from said cache unit; and wherein said first stage means includes:

(i) first input buffer means for temporarily storing at least one operation command;

(ii) second input buffer means for temporarily storing input operand data associated with said temporarily stored operation command; and (iii) switch means, operatively connected to said second input buffer means, for distributing said temporarily stored input operand data to a second stage means; and (b) second stage means, operatively connected to said first stage means, for executing a first predetermined group of said decimal type instructions.

9. A pipelined execution unit, according to claim 8, wherein said second input buffer means comprises:

(a) a first and second operand input stack, each operand input stack having a terminal adapted to receive said input operand data, each operand input stack having an output terminal adapted to transmit said input operand data, and each output terminal coupled to said switch means; and (b) a third operand input stack, operatively connected to said second stage means, for temporarily storing intermediate resultant operand data, wherein said intermediate resultant operand data is to be utilized as operand data for an operation command temporarily stored in said first input buffer means.

10. A pipelined execution unit, according to claim 9, wherein said second stage means comprises:

(a) first network means, having an input terminal adapted to receive said input operand data, the input terminal of said first network means operatively connected to said switch means, for aligning said input operand data in a predetermined format, and further having an output terminal adapted to transmit the aligned input operand data;

(b) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters; and (c) third network means having an input terminal adapted to receive a character string, the input terminal of said third network means operatively connected to the output terminal of said second network means, for performing edit operations on said character string, and further having an output terminal adapted to transmit an edited output string.

11. A pipelined execution unit, according to claim 10, wherein said first network means comprises:
(a) first switch means, operatively connected to the input terminal of said first network means, for selecting the input operand data;
(b) first register means, operatively connected to said first switch means, for storing the selected input operand data;
(c) first shift network means, operatively connected to said first register means, for performing a nine-to-four shift of the input operand data;
(d) second shift network means, operatively connected to said first register means, for performing a six-to-six shift of the input operand data, the input operand data directed to one of said first or second shift network means; and
(e) second switch means, operatively connected to said first and second shift network means, for directing the shifted input operand data to the output terminal of said first network means.

12. A pipelined execution unit, according to claim 11, wherein said second network means comprises:
(a) first compare switch means, operatively connected to the first input terminal of said second network means to receive said input operand data, for inserting a fill character in said input operand data;
(b) a second compare switch means, operatively connected to the second input terminal of said second network means to receive said aligned input operand data, for inserting a fill character in said aligned input operand data;
(c) a first compare register means, operatively connected to said first compare switch means, for holding said filled input operand data;
(d) a second compare register means, operatively connected to said second compare switch means, for holding said filled aligned input operand data;
(e) first compare means, operatively connected to said first and second compare register means, for comparing said filled input operand data to said filled aligned operand data to generate said zero indicator signal and said carry indicator signal; and
(f) third compare switch means, operatively connected to said first and second compare register means, for transmitting character data to the output terminal of said second network means.

13. A pipelined execution unit, according to claim 12, wherein said third network means comprises:
(a) first edit register means, operatively connected to said second network means, for holding a first character of said filled input operand data;
(b) second edit register means, operatively connected to said second network means, for holding a first character of said filled aligned input operand data;
(c) edit logic means, operatively connected to said first and second edit register means, for performing an edit operation on respective characters of said filled input operand data and said filled aligned input operand data; and
(d) third edit register means, operatively connected to said edit logic means, for temporarily storing edited characters prior to transmitting said edited characters to the output terminal of said third network means.

14. A pipelined execution unit, according to claim 13, wherein said second stage means further comprises:
fourth network means, operatively connected to said second input buffer, for extracting the sign character and exponent quantity associated with said input operand data, and further having an output terminal adapted to transmit said sign character and exponent quantity.

15. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:
(a) first stage means, operatively connected to said central unit and to said cache unit, for temporarily storing input data, said input data including operation commands being received from said central unit defining said decimal type instructions, and said input operand data being received from said cache unit; and wherein said first stage means includes:
(i) first input buffer means for temporarily storing at least one operation command;
(ii) second input buffer means for temporarily storing input operand data associated with said temporarily stored operation command; and
(iii) switch means, operatively connected to said second input buffer means, for distributing said temporarily stored input operand data to a second stage means; and
(b) second stage means, operatively connected to said first stage means, for executing a first predetermined group of said decimal type instructions; and
(c) third stage means, operatively coupled to said second stage means, for executing a second predetermined group of said decimal type instructions, said second predetermined group including arithmetic type instructions.

16. A pipelined execution unit, according to claim 15, wherein said second input buffer means comprises:
(a) a first and second operand input stack, each operand input stack having a terminal adapted to receive said input operand data, each operand input stack having an output terminal adapted to transmit said input operand data, and each output terminal coupled to said switch means; and (b) a third operand input stack, operatively connected to said third stage means, for temporarily storing intermediate resultant operand data, wherein said intermediate resultant operand data is to be utilized as operand data for an operation command temporarily stored in said first input buffer means.

17. A pipelined execution unit, according to claim 16, wherein said second stage means comprises:
   (a) first network means, having an input terminal adapted to receive said input operand data, the input terminal of said first network means operatively connected to said switch means, for aligning said input operand data in a predetermined format, and further having an output terminal adapted to transmit the aligned input operand data;
   (b) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters; and
   (c) third network means having an input terminal adapted to receive a character string, the input terminal of said third network means operatively connected to the output terminal of said second network means, for performing edit operations on said character string, and further having an output terminal adapted to transmit an edited output string.

18. A pipelined execution unit, according to claim 17, wherein said first network means comprises:
   (a) first switch means, operatively connected to the input terminal of said first network means, for selecting the input operand data;
   (b) first register means, operatively connected to said first switch means, for storing the selected input operand data;
   (c) first shift network means, operatively connected to said first register means, for performing a nine-to-four shift of the input operand data;
   (d) second shift network means, operatively connected to said first register means, for performing a six-to-six shift of the input operand data, the input operand data directed to one of said first or second shift network means; and
   (e) second switch means, operatively connected to said first and second shift network means, for directing the shifted input operand data to the output terminal of said first network means.

19. A pipelined execution unit, according to claim 18, wherein said second network means comprises:
   (a) first compare switch means, operatively connected to the first input terminal of said second network means to receive said input operand data, for inserting a fill character in said input operand data;
   (b) a second compare switch means, operatively connected to the second input terminal of said second network means to receive said aligned input operand data, for inserting a fill character in said aligned input operand data;
   (c) a first compare register means, operatively connected to said first compare switch means, for holding said filled input operand data;
   (d) a second compare register means, operatively connected to said second compare switch means, for holding said filled aligned input operand data;
   (e) first compare means, operatively connected to said first and second compare register means, for comparing said filled input operand data to said filled aligned input operand data to generate said zero indicator signal and said carry indicator signal; and
   (f) third compare switch means, operatively connected to said first and second compare register means, for transmitting character data to the output terminal of said second network means.

20. A pipelined execution unit, according to claim 19, wherein said third network means comprises:
   (a) first edit register means, operatively connected to said second network means, for holding a first character of said filled input operand data;
   (b) second edit register means, operatively connected to said second network means, for holding a first character of said filled aligned input operand data;
   (c) edit logic means, operatively connected to said first and second edit register means, for performing an edit operation on respective first characters of said filled input operand data and said filled aligned input operand data; and
   (d) third edit register means, operatively connected to said edit logic means, for temporarily storing edited characters prior to transmitting said edited characters to the output terminal of said third network means.

21. A pipelined execution unit, according to claim 20, wherein said second stage means further comprises:
   fourth network means, operatively connected to said second input buffer, for extracting the sign character and exponent quantity associated with said input operand data, and further having an output terminal adapted to transmit said sign character and exponent quantity.

22. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:

(a) first input buffer means, operatively connected to said central unit, for temporarily storing at least one operation command;

(b) second input buffer means, operatively connected to said cache unit, for temporarily storing input operand data associated with said temporarily stored operation command;

(c) switch means, operatively connected to said second input buffer means, for distributing said temporarily stored input operand data;

(d) first network means, having an input terminal adapted to receive said input operand data, the input terminal of said first network means operatively connected to said switch means, for aligning said input operand data in a predetermined format, and further having an output terminal adapted to transmit the aligned input operand data;

(e) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters; and (f) third network means having an input terminal adapted to receive a character string, the input terminal of said third network means operatively connected to the output terminal of said second network means, for performing edit operations on said character string, and further having an output terminal adapted to transmit an edited output string.

23. A pipelined execution unit, according to claim 22, wherein said second input buffer means comprises:

(a) a first and second operand input stack, each operand input stack having a terminal adapted to receive said input operand data, each operand input stack having an output terminal adapted to transmit said input operand data, and each output terminal coupled to said switch means; and (b) a third operand input stack, operatively connected to said fourth stage means, for temporarily storing resultant operand data, wherein said resultant operand data is to be utilized as operand data for an operation command temporarily stored in said first input buffer means.

24. A pipelined execution unit, according to claim 23 wherein said first network means comprises:

(a) first switch means, operatively connected to the input terminal of said first network means, for selecting the input operand data;

(b) first register means, operatively connected to said first switch means, for storing the selected input operand data;

(c) first shift network means, operatively connected to said first register means, for performing a nine-to-four shift of the input operand data;

(d) second shift network means, operatively connected to said first register means, for performing a six-to-six shift of the input operand data, the input operand data directed to one of said first or second shift network means; and (e) second switch means, operatively connected to said first and second shift network means, for directing the shifted input operand data to the output terminal of said first network means.

25. A pipelined execution unit, according to claim 24, wherein said second network means comprises:

(a) first compare switch means, operatively connected to the first input terminal of said second network means to receive said input operand data, for inserting a fill character in said input operand data;

(b) a second compare switch means, operatively connected to the second input terminal of said second network means to receive said aligned input operand data, for inserting a fill character in said aligned input operand data;

(c) a first compare register means, operatively connected to said first compare switch means, for holding said filled input operand data;

(d) a second compare register means, operatively connected to said second compare switch means, for holding said filled aligned input operand data;

(e) first compare means, operatively connected to said first and second compare register means, for comparing said filled input operand data to said filled aligned input operand data to generate said zero indicator signal and said carry indicator signal; and (f) third compare switch means, operatively connected to said first and second compare register means, for transmitting character data to the output terminal of said second network means.

26. A pipelined execution unit, according to claim 25, wherein said third network means comprises:

(a) first edit register means, operatively connected to said second network means, for holding a first character of said filled input operand data;

(b) second edit register means, operatively connected to said second network means, for holding a first character of said filled aligned input operand data;

(c) edit logic means, operatively connected to said first and second edit register means, for performing an edit operation on respective first characters of said filled input operand data and said filled aligned input operand data; and (d) edit register means, operatively connected to said edit logic means, for temporarily storing edited characters prior to transmitting said edited characters to the output terminal of said third network means.

27. A pipelined execution unit, according to claim 26, wherein said second stage means further comprises:

fourth network means, operatively connected to said second input buffer, for extracting the sign character and exponent quantity associated with said input operand data, and further having an output terminal adapted to transmit said sign character and exponent quantity.

28. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:

(a) first input buffer means, operatively connected to said central unit, for temporarily storing at least one operation command;

(b) second input buffer means, operatively connected to said cache unit, for temporarily storing input operand data associated with said temporarily stored operation command;

(c) switch means, operatively connected to said second input buffer means, for distributing said temporarily stored input operand data;

(d) first network means, having an input terminal adapted to receive said input operand data, the input terminal of said first network means operatively connected to said switch means, for aligning said input operand data in a predetermined format, and further having an output terminal adapted to transmit the aligned input operand data;

(e) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters;

(f) third network means having an input terminal adapted to receive a character string, the input terminal of said third network means operatively connected to the output terminal of said second network means, for performing edit operations on said character string, and further having an output terminal adapted to transmit an edited output string; and (g) arithmetic network means, operatively connected to the output terminal of said first network means, for executing a predetermined group of decimal arithmetic instructions.

29. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, including a decimal execution unit, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction and transferring the instruction to a predetermined one of the execution units, each execution unit performing the execution of a predetermined class of instruction, each execution unit being operatively connected to said cache unit for receiving operands and to said central unit for receiving instructions processed by said central unit, said decimal execution unit being a pipelined execution unit for executing decimal-type instructions, said pipelined execution unit comprising:

(a) first input buffer means, operatively connected to said central unit, for temporarily storing at least one operation command;

(b) second input buffer means, operatively connected to said cache unit, for temporarily storing input operand data associated with said temporarily stored operation command;

(c) switch means, operatively connected to said second input buffer means, for distributing said temporarily stored input operand data;

(d) first network means, having an input terminal adapted to receive said input operand data, the input terminal of said first network means operatively connected to said switch means, for aligning said input operand data in a predetermined format, and further having an output terminal adapted to transmit the aligned input operand data;

(e) second network means, having a first and second input terminal adapted to receive said input operand data and said aligned input operand data, respectively, the first input terminal of said second network means operatively connected to said switch means and the second input terminal of said second network means operatively connected to the output terminal of said first network means, for performing a magnitude comparison between the input operand data and the aligned input data to generate a zero indicator signal and a carry indicator signal, and having an output terminal adapted to transmit predetermined characters;

(f) third network means having an input terminal adapted to receive a character string, the input terminal of said third network means operatively connected to the output terminal of said second network means, for performing edit operations on said character string, and further having an output terminal adapted to transmit an edited output string;

(g) arithmetic network means, operatively connected to the output terminal of said first network means, for executing a predetermined group of decimal arithmetic instructions; and (h) output network means, operatively connected to said first network means and to said third network means, for temporarily storing output data resulting from the execution of said operation commands, and further having an output terminal adapted to transmit said output data.

* * * * *